(12) United States Patent
    Otsubo et al.

(10) Patent No.: US 12,600,482 B2
(45) Date of Patent: Apr. 14, 2026

(54) ACTUATOR, SAFETY DEVICE, AND FLYING BODY

(71) Applicant: NIPPON KAYAKU KABUSHIKI KAISHA, Tokyo (JP)

(72) Inventors: Hideki Otsubo, Tokyo (JP); Hiroshi Nakamura, Tokyo (JP)

( * ) Notice: Subject to any disclaimer, the term of this patent is extended or adjusted under 35 U.S.C. 154(b) by 0 days.

(21) Appl. No.: 18/565,534

(22) PCT Filed: Apr. 22, 2022

(86) PCT No.: PCT/JP2022/018641
    § 371 (c)(1),
    (2) Date: Nov. 30, 2023

(87) PCT Pub. No.: WO2022/255000
    PCT Pub. Date: Dec. 8, 2022

(65) Prior Publication Data
    US 2024/0255010 A1      Aug. 1, 2024

(30) Foreign Application Priority Data
    May 31, 2021    (JP) ................................. 2021-091974

(51) Int. Cl.
    F15B 15/19       (2006.01)
    B64D 1/12        (2006.01)
        (Continued)

(52) U.S. Cl.
    CPC .............. B64D 17/80 (2013.01); B64D 1/12 (2013.01); B64U 70/83 (2023.01);
        (Continued)

(58) Field of Classification Search
    CPC ....... F15B 15/19; B60R 21/38; B60R 21/264; B64D 17/80; B64D 1/12; B64U 70/83;
        (Continued)

(56) References Cited

U.S. PATENT DOCUMENTS

| | | | | |
|---|---|---|---|---|
| 3,234,727 A | * | 2/1966 | Filer ....................... | F42B 3/006 |
| | | | | 29/523 |
| 3,242,666 A | * | 3/1966 | Peterson ................. | F15B 15/19 |
| | | | | 89/1.51 |

(Continued)

FOREIGN PATENT DOCUMENTS

| | | |
|---|---|---|
| JP | 2009-236313 A | 10/2009 |
| JP | 2016-11079 A | 1/2016 |

(Continued)

OTHER PUBLICATIONS

ISR; Japan Patent Office; Tokyo; Jul. 19, 2022.
(Continued)

*Primary Examiner* — Dustin T Nguyen
(74) *Attorney, Agent, or Firm* — Patshegen IP; Moshe Pinchas

(57)        ABSTRACT

There are provided an actuator that can be reduced in weight as compared with a related art while alleviating an impact at an activation, a safety apparatus that ejects an ejected object, and an aerial vehicle including the safety apparatus. A safety apparatus 100 includes an actuator 1, a push-up member 15 that is pushed up in one direction by the actuator 1, an ejected object 16 that is pushed up while being supported by the push-up member 15, a bottomed cylindrical container 18, and a lid 21 that closes an opening end of the container 18. The actuator 1 includes a piston member 10, a cylinder 14 that accommodates the piston member 10 and is provided with a bore 13 through which the piston member 10 protrudes outward at the time of activation, a base 2 to which one end of the cylinder 14 is caulked and fixed and that is attached to a center of a bottom inside the container 18, and a gas generator 17 as a power source for moving the piston member 10 in the cylinder 14.

6 Claims, 39 Drawing Sheets

(51) Int. Cl.

| | |
|---|---|
| *B64D 17/80* | (2006.01) |
| *B64U 70/83* | (2023.01) |
| *F15B 15/14* | (2006.01) |
| *F15B 15/22* | (2006.01) |
| *B64U 101/57* | (2023.01) |
| *B64U 101/69* | (2023.01) |

(52) U.S. Cl.
CPC ...... *F15B 15/1428* (2013.01); *F15B 15/1447* (2013.01); *F15B 15/19* (2013.01); *F15B 15/226* (2013.01); *F15B 15/227* (2013.01); *B64U 2101/57* (2023.01); *B64U 2101/69* (2023.01)

(58) Field of Classification Search
CPC ........... B64U 2101/57; B64U 2101/69; F15B 15/1428; F15B 15/1447; F15B 15/226; F15B 15/227
See application file for complete search history.

(56) References Cited

U.S. PATENT DOCUMENTS

| | | | | |
|---|---|---|---|---|
| 4,091,621 | A * | 5/1978 | Patrichi | F15B 15/19 |
| | | | | 60/636 |
| 5,719,351 | A * | 2/1998 | Johnson | B60R 21/264 |
| | | | | 102/440 |
| 6,851,372 | B2 * | 2/2005 | Bender | F15B 15/261 |
| | | | | 89/1.14 |
| 7,857,087 | B2 * | 12/2010 | Matsuura | B60R 21/38 |
| | | | | 180/274 |
| 8,534,174 | B2 * | 9/2013 | Kajita | B27G 19/02 |
| | | | | 89/7 |
| 11,511,870 | B2 * | 11/2022 | Shen | B64U 70/83 |
| 11,731,769 | B2 * | 8/2023 | Yagihashi | B64U 70/83 |
| | | | | 244/142 |
| 2011/0314809 | A1 * | 12/2011 | Laspesa | F15B 15/262 |
| | | | | 60/638 |
| 2016/0318615 | A1 * | 11/2016 | Pick | B64D 17/54 |

FOREIGN PATENT DOCUMENTS

| | | |
|---|---|---|
| JP | 2017-30440 A | 2/2017 |
| JP | 2018-168927 A | 11/2018 |
| JP | 2020-01680 A | 1/2020 |
| KR | 2018-0095470 A | 8/2018 |

OTHER PUBLICATIONS

ESSR; European Patent Office; Munich; Feb. 27, 2025.
Japanese Office Action, JP2020-178468; Dec. 26, 2023.
Japanese Office Action, JP2020-178468; May 30, 2024.

* cited by examiner

62

(a)

(b)

(a)

(b)

(a)

(b)

ACTUATOR, SAFETY DEVICE, AND FLYING BODY

TECHNICAL FIELD

The present invention relates to an actuator, and relates to a safety apparatus that includes the actuator and ejects an ejected object such as a parachute, or a paraglider, and relates to an aerial vehicle including the safety apparatus.

BACKGROUND ART

In recent years, with the development of an autonomous control technology and a flight control technology, an industrial use of an aerial vehicle provided with a plurality of rotor blades called a drone, for example, has been accelerating. The drone can fly, for example, by simultaneously rotating a plurality of rotor blades in a well-balanced manner, ascend and descend by increasing or decreasing a rotation speed of the rotor blades, and advance and retreat by tilting an airframe by increasing and decreasing the rotation speed of the rotor blades. Such an aerial vehicle is assumed not only to be used for disaster activities, cargo transport, landscape photographing, and the like, but also to be used by humans, and is expected to be used and expanded worldwide in the future.

Meanwhile, the risk of fall accidents of the aerial vehicles as described above is considered to be dangerous and hinders spread of the aerial vehicles. In order to reduce the risk of such fall accidents, parachute apparatuses for aerial vehicles have been commercialized as safety apparatuses.

As an example of the parachute safety apparatus, the applicant(s) filed an application according to Patent Literature 1 below. As illustrated in FIG. 1 of Patent Literature 1, a safety apparatus of Patent Literature 1 includes a piston member (sliding member), a cylinder that accommodates the piston member and is provided with a bore through which the piston member protrudes to the outside at the time of activation, a push-up member pushed up in one direction by the piston member, an ejected object pushed up while being supported by the push-up member, a gas generator that moves the piston member in the cylinder, and a container that accommodates at least the ejected object, the piston member, and the cylinder, in which the push-up member has a support disposed at a terminal end of the piston member with respect to a distal end of the piston member in a moving direction of the piston member. A bottom of the push-up member is fixed to the distal end of the piston member.

CITATION LIST

Patent Literature

Patent Literature 1: JP 2020-001680 A

SUMMARY OF INVENTION

Technical Problems

Although having excellent safety performance, the safety apparatus disclosed in Patent Literature 1 is required to be attached to a central portion of an aerial vehicle, lacks diversity of attachment positions to the aerial vehicle, and thus, is difficult to attach to the aerial vehicle in accordance with an individual situation of the aerial vehicle. In recent years, it has also been desired to improve ease of accommodation of the ejected object in the container of the safety apparatus.

Therefore, an object of the present invention is to provide a safety apparatus that not only has excellent safety performance but also is capable of securing diversity of attachment positions to an aerial vehicle as compared with a related art, or has improved ease of accommodation of an ejected object in a container, and an aerial vehicle including the safety apparatus.

Solutions to Problems (1) A safety apparatus includes a sliding member, an actuator including a power source that generates a driving force for sliding the sliding member toward one side, a support that extends from the sliding member and supports an ejected object in an initial state, and a container that accommodates at least the sliding member, the actuator, the support, and the ejected object inside the container, in which a bottom of the actuator is fixed to a bottom surface of the container in a state of being disposed at a position shifted from a geometric center of the bottom surface of the container.

(2) In the safety apparatus according to (1), the safety apparatus is preferably attachable to an outside of an aerial vehicle, and at least a part of an outer shape of the container preferably has a shape that conforms to an outer shape of a predetermined position of the aerial vehicle.

(3) In the safety apparatus according to (1), the safety apparatus is preferably attachable to an outside of an aerial vehicle, and the safety apparatus preferably further includes a trigger device that transmits an automatic start signal for automatically starting the actuator to the actuator in a case where the aerial vehicle is in an abnormal state, or transmits a start signal for starting the actuator to the actuator in a case where a trigger signal is received.

(4) In the safety apparatus according to (3), the aerial vehicle preferably includes a propulsion device that propels the aerial vehicle, and the trigger device preferably includes an abnormal state determiner that determines whether the aerial vehicle is in the abnormal state, and a stop unit that can transmit a signal for stopping the propulsion device to the propulsion device and stop the propulsion device when the abnormal state determiner determines that the aerial vehicle is in the abnormal state.

(5) In the safety apparatus according to (1) to (4), the ejected object is preferably a pilot chute and a main parachute, the main parachute is preferably connected to the pilot chute via a coupling member, the container preferably includes a first housing and a second housing, the first housing preferably houses the pilot chute and is provided with the actuator that ejects the pilot chute, and the second housing preferably houses the main parachute.

(6) As another aspect, in the safety apparatus according to (1) to (4), the ejected object may be any one or more of a net member for capturing or binding, an extinguishing agent, a life aid, or a medicine.

(7) An aerial vehicle of the present invention includes an airframe, the safety apparatus according to any of (1) to (6), and a propulsion mechanism that is joined to the airframe and propels the airframe.

Advantageous Effects of Invention

The present invention can provide a safety apparatus that not only has excellent safety performance but also is capable of securing diversity of attachment positions to an aerial vehicle as compared with a related art, or has improved ease of accommodation of an ejected object in a container, and an aerial vehicle including the safety apparatus.

DESCRIPTION OF EMBODIMENTS

Hereinafter, an aerial vehicle including a safety apparatus according to a first embodiment of the present invention will be described with reference to FIGS. 1 to 7.

Figure 1:
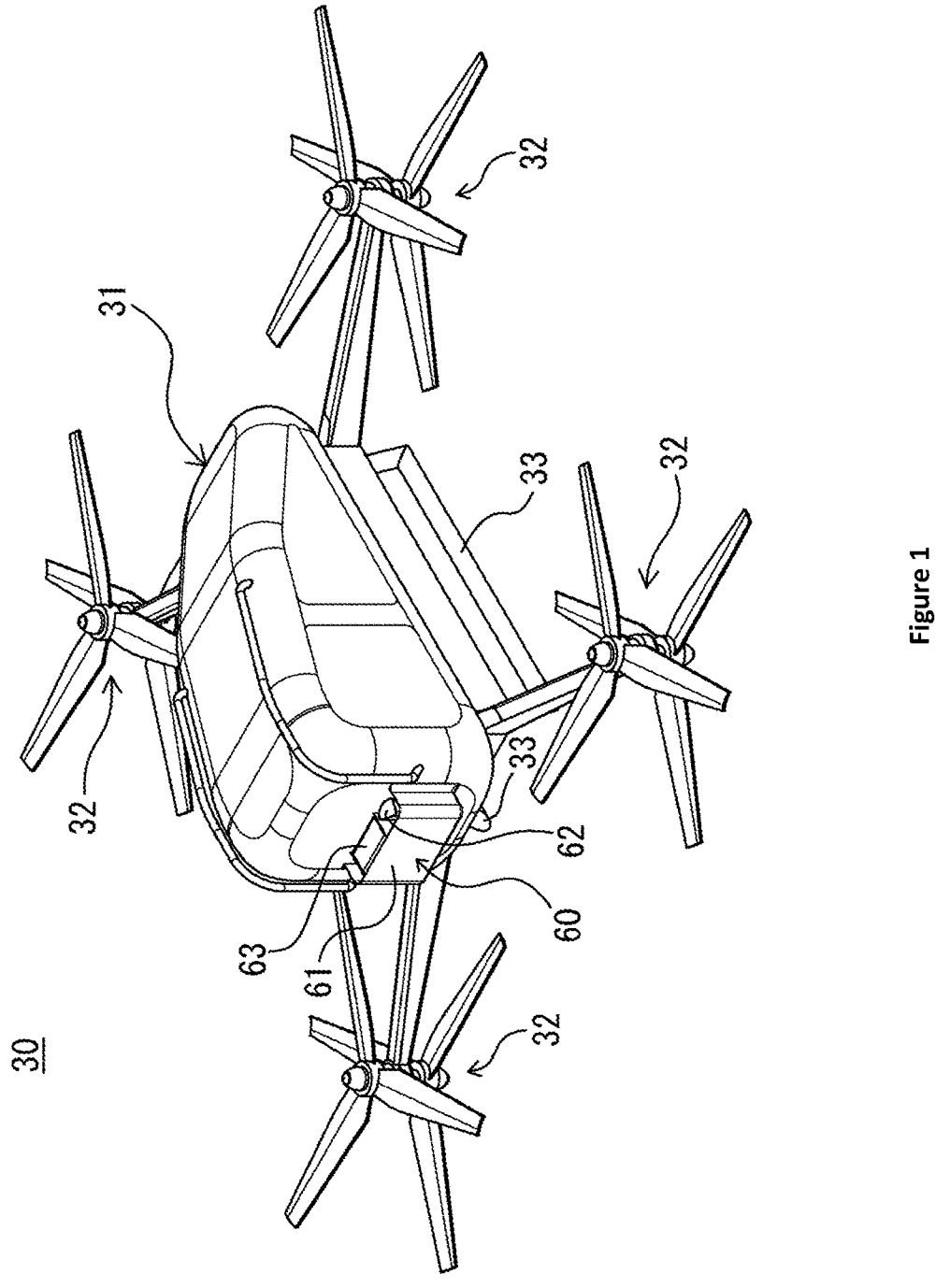
FIG. 1 is a perspective view of an aerial vehicle to which a safety apparatus according to a first embodiment of the present invention is attached.

As shown in FIG. 1, an aerial vehicle 30 includes an airframe 31, a safety apparatus 100 attached to the airframe 31, one or more propulsion mechanisms (for example, propellers) 32 joined to the airframe 31 to propel the airframe 31, and a plurality of legs 33 provided in a lower part of the airframe 31.

Figure 2:
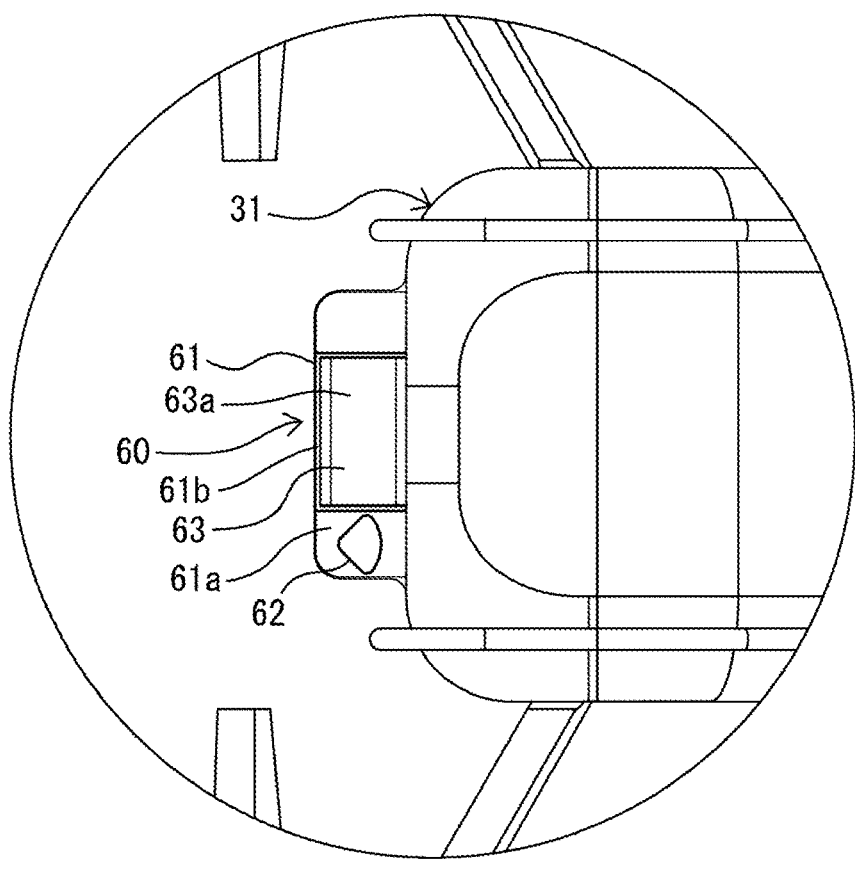
FIG. 2 is an enlarged plan view showing the vicinity of the safety apparatus in the aerial vehicle in FIG. 1.

As shown in FIGS. 1 and 2, a safety apparatus 60 includes an attachment member 61, a pilot chute ejector 62, a main parachute storage 63, and a trigger device (not shown). Note that, although not shown, the trigger device can be provided inside (in a portion that does not interfere with an operation of other parts) or outside a container 18, or inside or outside the airframe 31 of the aerial vehicle 30.

As shown in FIG. 2, the attachment member 61 has a section 61a having a bottom to which the pilot chute ejector 62 is fixed, and a section 61b in which a main parachute storage 63 is installed.

The main parachute storage 63 includes a main parachute (not shown) larger than a pilot chute 16 (described later), and a cloth 63a covering the periphery of the main parachute folded in an initial state. Since the main parachute covered with the cloth 63a is housed in the section 61b of the attachment member 61 separately from the pilot chute 16, the main parachute can be housed more easily than in a case where the attachment member 61 is not divided into sections. The cloth 63a may or need not be formed in a shape conforming to an outer shape of the airframe 31 of the aerial vehicle 30. Although not shown, the main parachute is coupled to the pilot chute 16 (described later) which is discharged from the pilot chute ejector 62 via a coupling member (for example, a string member). Although not shown, the main parachute is coupled to, for example, a connection portion (four locations) between the airframe 31 of the aerial vehicle 30 and the propulsion mechanism 32 via four other coupling members (for example, string members) so as to suspend the aerial vehicle 30 in a state shown in FIG. 1 (a state of a normal orientation) after being deployed in an emergency. When the pilot chute 16 (described later) is ejected, the main parachute is pulled toward an upper part of the cloth 63a via the coupling member (for example, a string member), the upper part of the cloth 63a pushed up by the main parachute is opened (for example, the upper part of the cloth 63a is peeled off), and the main parachute is smoothly and quickly ejected and developed from the main parachute storage 63. Then, after the main parachute is deployed, the aerial vehicle 30 is suspended in the state shown in FIG. 1 (the state of the normal orientation), and is landed by the legs 33 in the same manner as in a normal time.

Figure 3:
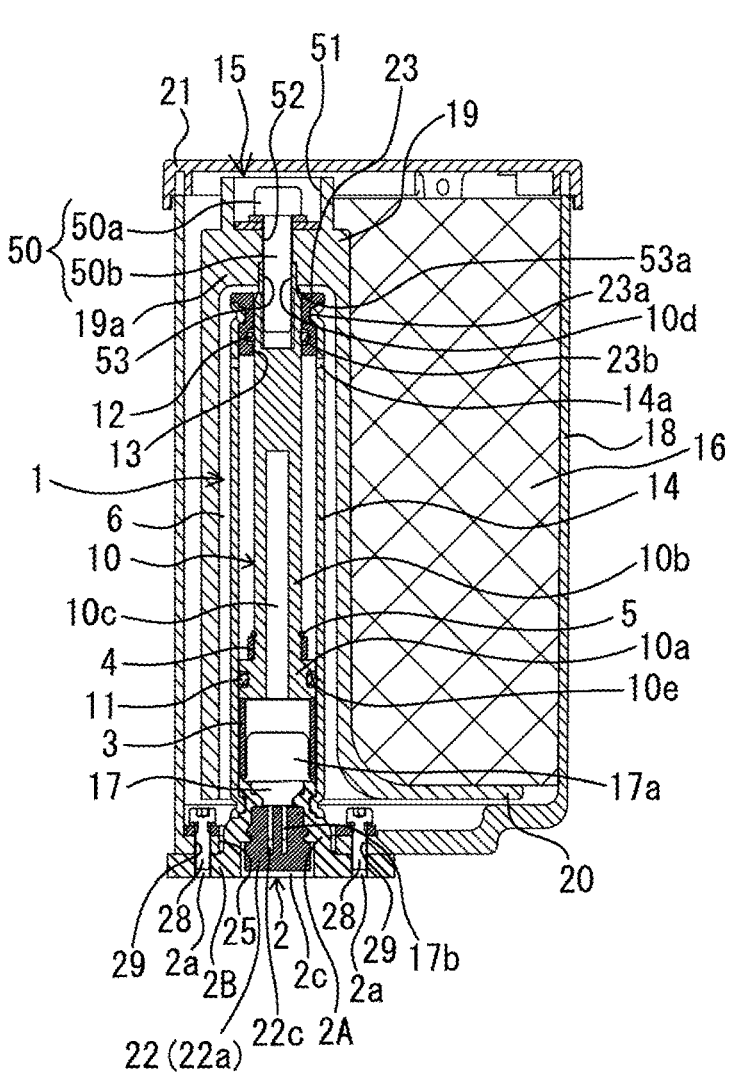
FIG. 3 is a sectional view of a pilot chute ejector of the safety apparatus in FIG. 1.
Figure 4:
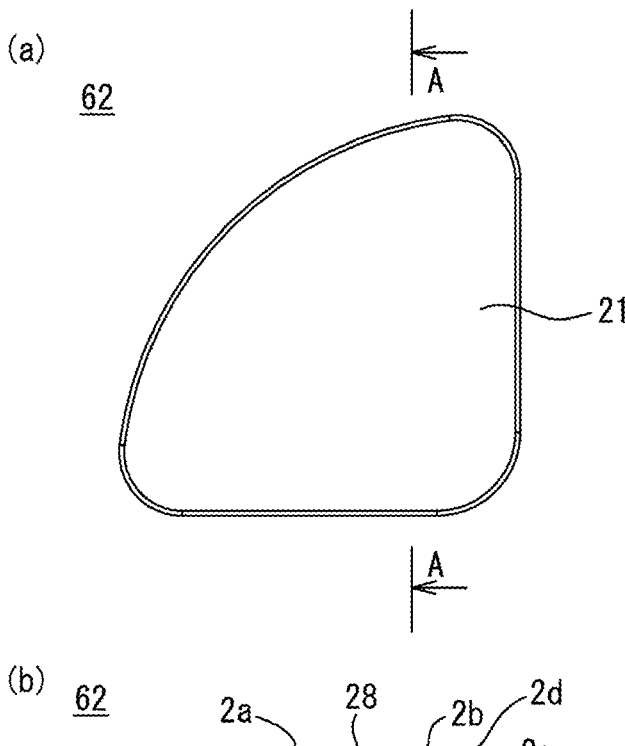
FIG. 4(*a*) is a plan view of the pilot chute ejector in FIG. 3, and FIG. 4(*b*) is a bottom view of the pilot chute ejector in FIG. 3.
Figure 4:
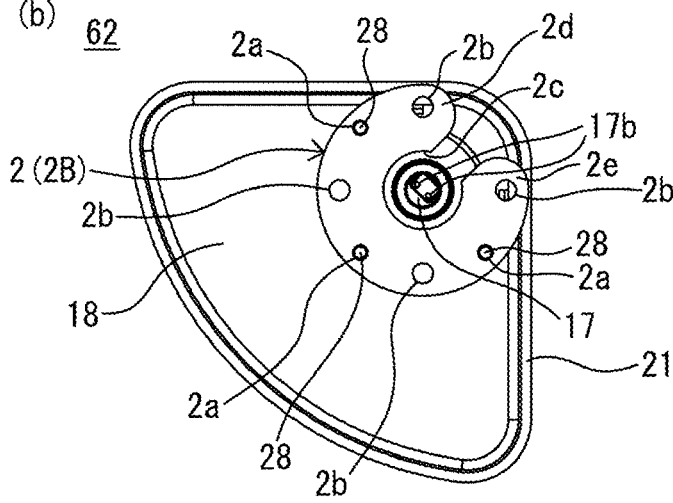
Figure 5:
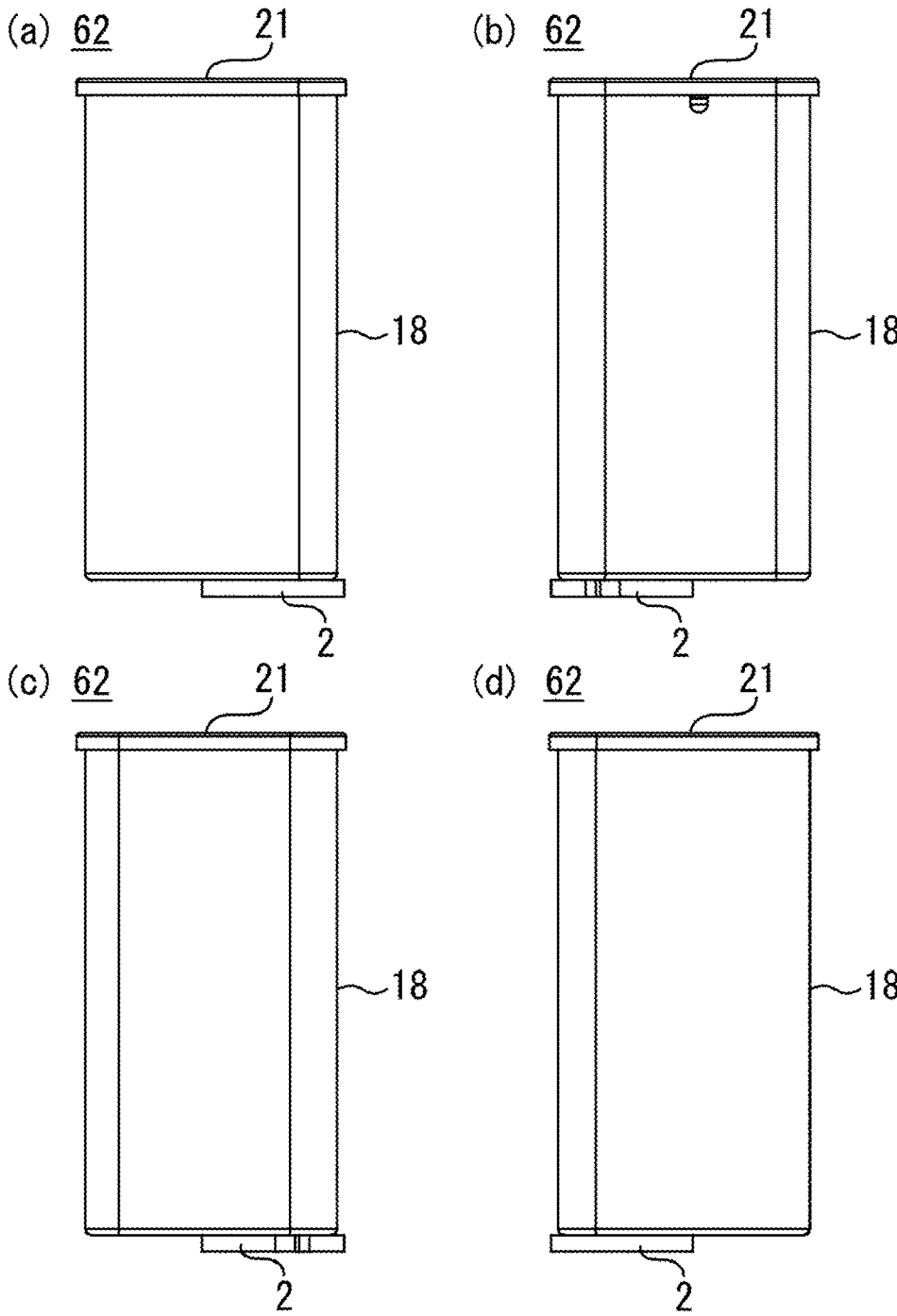
FIG. 5(*a*) is a left side view of the pilot chute ejector in FIG. 3, FIG. 5(*b*) is a right side view of the pilot chute ejector in FIG. 3, FIG. 5(*c*) is a front view of the pilot chute ejector in FIG. 3, and FIG. 5(*d*) is a rear view of the pilot chute ejector in FIG. 3.
Figure 6:
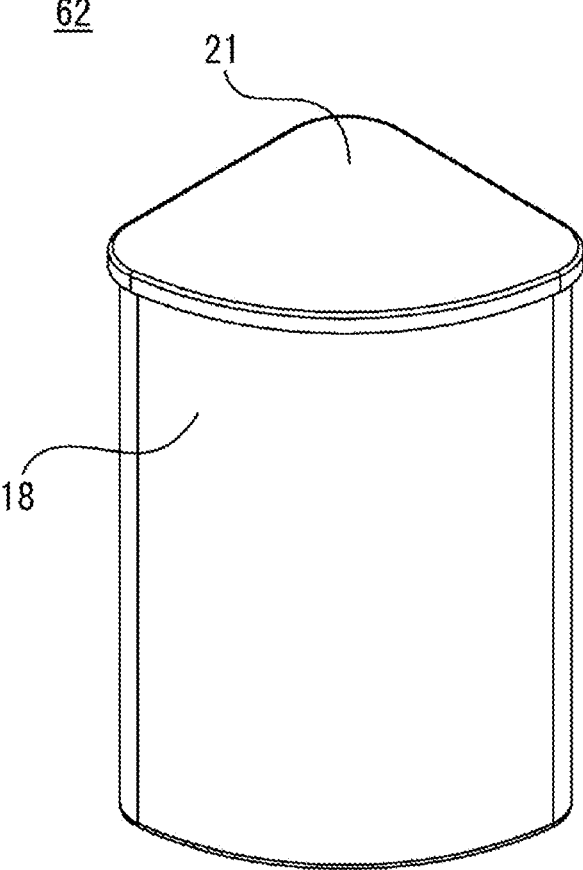
FIG. 6 is a perspective view of the pilot chute ejector in FIG. 3.

As shown in FIG. 3, the pilot chute ejector 62 includes an actuator 1, a push-up member 15 pushed up in one direction (upward in FIG. 1) by the actuator 1, the pilot chute 16 pushed up while being supported by the push-up member 15, the bottomed cylindrical container 18 that accommodates the actuator 1, the push-up member 15, and the pilot chute 16, and a lid 21 having a fan-shaped cross section that closes an opening end of the container 18. Here, FIG. 3 is also a sectional view taken along line A-A in FIG. 4 (some portions are not shown in cross section).

The actuator 1 includes a piston member 10 that is a sliding member, a cylinder 14 that accommodates the piston member 10 and is provided with a bore 13 through which the piston member 10 protrudes outward (upward in FIGS. 1 and 2) at the time of activation, a base 2 (squib holder) to which one end of the cylinder 14 is caulked and fixed and that is attached to a center of a bottom inside the container 18, and a gas generator (microgas generator or the like) 17 as a power source for moving the piston member 10 in the cylinder 14.

As shown in FIG. 3, the base 2 includes a substantially cylindrical member 2A that holds the gas generator 17 that generates power for sliding the piston member 10 on a side close to the cylinder 14, and a flange 2B provided on the substantially cylindrical member 2A on the side opposite to the cylinder 14.

The flange 2B includes a plurality of holes 2a used to attach the flange 2B to the container 18, a plurality of holes 2b used to attach the flange 2B to the attachment member 61, an insertion port 2c used to fit and insert a connector 22 for energization into an electrode 17b under the gas generator 17, and distal ends 2d and 2e, and is processed into a substantially horseshoe shape (a shape in which a part of a ring shape is cut out from an outer edge to a center to form a notch between the distal ends 2d and 2e) having a substantially U shape. An inner wall of each of the holes 2a is internally threaded, and a bolt 28 is screwed from inside of the container 18. The inner wall of each of the holes 2b is also internally threaded, and a bolt (not shown) is screwed from a bottom surface of the attachment member 61 so that the base 2 can be fixed to the attachment member 61. As shown in FIG. 4(b), each of the distal ends 2d and 2e of the base 2 has a rounded curved shape (R shape or the like) so as not to damage a component by contact, injure a human body, and the like. A space (notch) between the distal ends 2d and 2e communicates with the insertion port 2c.

The piston member 10 includes a body 10a having a portion having an outer diameter substantially equal to an inner diameter of the cylinder 14, a rod 10b connected to the body 10a, extending upward, and having a smaller diameter than the body 10a, a hole 10c provided inside the body 10a and the rod 10b, an internal thread 10d provided at an upper end of the rod 10b, and a groove 10e provided in a peripheral direction of the body 10a.

Although not shown, at least the upper end of the rod 10b has a non-circular cross section. Here, the non-circular shape is, for example, a polygonal shape, an elliptical shape, a star shape, a gear shape, or the like, but includes any shape as long as the shape is a non-circular shape. Furthermore, in a lower part of the rod 10b, the tubular member 4 is fitted into to be installed or loosely fitted in a state where one end is in contact with the body 10a. Although there may be a gap between an inner wall of the tubular member 4 and an outer wall of the rod 10b, the gap may be within a range that does not hinder plastic deformation due to substantially uniform compression at a time of collision described later.

As shown in FIG. 2, the tubular member 4 is held by a holding member 5 at a lower part of the rod 10b in a state where one end of the tubular member 4 is in contact with the body 10a. In addition, the tubular member 4 includes a plastically deformable material and a material (for example, metals such as aluminum, brass, alloys such as stainless steel, resins such as monomeric cast nylon, polyamide synthetic resins such as nylon 6, nylon 6,6, and nylon 4,6, and the like) having a tensile strength lower than tensile strengths of the piston member 10 and a stopper member 23 (for example, a metal such as iron, aluminum, brass, or copper, an alloy such as stainless steel, a resin, or the like) described later. Here, the holding member 5 may be an elastic member such as rubber, may include the same material as the tubular member 4, and may have a ring shape or a clip shape.

In addition, the tubular member 4 and an inner wall of the cylinder 14 are separated from each other by a predetermined distance (for example, a distance by which the tubular member 4 plastically deformed by substantially uniform compression when colliding with the stopper member 23 does not contact the inner wall of the cylinder 14) or more so that the tubular member 4 does not contact the inner wall of the cylinder 14. As a result, even if the tubular member 4 collides with the stopper member 23 and is plastically deformed, the tubular member 4 is deformed without being hindered by the inner wall of the cylinder 14, and sufficiently alleviates the impact of the piston member 10.

The hole 10c is formed along a central axis from a lower end of the body 10a to a middle of the rod 10b. As a result, the piston member 10 is reduced in weight as compared with a case where the hole 10c is not formed.

The internal thread 10d is formed from a distal end of the rod 10b to a middle along the central axis. An external thread 50b of a bolt member 50 (described later) can be screwed with the internal thread 10d.

The groove 10e is provided with a sealing member 11 such as an O-ring in a peripheral direction.

The substantially cylindrical stopper member 23 disposed so as to surround a part of the rod 10b of the piston member 10 is provided in an upper inner part of the cylinder 14. That is, the rod 10b is disposed in a state of being inserted through the bore 13 of the stopper member 23. In addition, the cylinder 14 is provided with a plurality of through holes 14a for discharging air in a space 6 to the outside at the time of activation.

The stopper member 23 restricts the movement of the tubular member 4 within the cylinder 14, and includes a groove 23a provided along an outer periphery and a groove 23b provided along an inner periphery. The groove 23a is used to caulk and fix the other end of the cylinder 14 to the stopper member 23. The groove 23b is provided with a sealing member 12 such as an O-ring in a peripheral direction.

The gas generator 17 is disposed below the body 10a (described later) of the piston member 10 in a state of being press-fitted into an opening end below the cylinder 14. A cylindrical member 3 for forming a predetermined distance from the piston member 10 is provided around a cup body 17a of the gas generator 17.

As shown in FIGS. 3, 4(b), and 5 to 7, the container 18 is a bottomed cylindrical member having a fan-shaped cross section, and has an opening to be closed by the lid 21 (see FIGS. 3 and 4(a)) having a fan-shaped cross section. In addition, as shown in FIGS. 3 and 4(b), a hole 25 into which the base 2 is inserted and a bolt fastening hole 29 are provided in the bottom of the container 18, and the actuator 1 is fixed via the base 2 to a position (here, a position at a predetermined distance or more from a portion of an arc of the fan-shaped cross section) shifted from a geometric center of the fan-shaped cross section in the bottom surface of the container 18. As a result, a space between the arc of the fan-shaped cross section and the actuator 1 is larger than in a case where the actuator 1 is installed at the geometric center of the fan-shaped cross section, and thus, the pilot chute 16 can be easily accommodated. That is, as compared with the case where the actuator 1 is installed at the geometric center of the fan-shaped cross section, ease of accommodation of the pilot chute 16 in the container 18 is improved.

The push-up member 15 includes metal (such as aluminum, iron, or an alloy), resin, or a composite material of resin and metal, CFRP, fiber reinforced resin, or the like, and includes a bottomed cylindrical portion 19 disposed so as to cover a part of the cylinder 14, that is, an outer portion of the cylinder 14 except for the vicinity of the opening end on the side where the gas generator 17 is disposed, and a fan-shaped support 20 provided at an opening of the bottomed cylindrical portion 19 to support the pilot chute 16, as shown in FIG. 1.

The bottomed cylindrical portion 19 includes a bottom 19a having a substantially flat plate shape or a substantially columnar shape (substantially columnar shape in the present embodiment), a hole 51 formed in the bottom 19a close to the lid 21, a hole 52 (second hole) having a diameter smaller than a diameter of the hole 51, and a hole 53 (first hole) communicating with the hole 51 through the hole 52 and having a diameter larger than the diameter of the hole 52. The hole 51 has a diameter larger than a diameter of a head 50a of the bolt member 50. The hole 52 has a diameter smaller than the diameter of the head 50a, and can guide the external thread 50b of the bolt member 50 inserted from the hole 51 to the hole 53. The hole 53 has a substantially identical shape to a shape of one end (upper end) of the rod 10b, and is a fitting portion into which one end of the rod 10b is fitted by inserting the one end of the rod 10b from an insertion opening 53a provided in the bottom 19a of the bottomed cylindrical portion 19, close to the cylinder 14.

The bolt member 50 couples the rod 10b and the push-up member 15 by inserting the external thread 50b into the hole 51 from the hole 52 and screwing the external thread 50b with the internal thread 10d of the rod 10b fitted in the hole 53. At this time, since the one end of the rod 10b has a non-circular shape and is fitted in the hole 53 having a substantially identical shape to the one end, the rod 10b does not rotate together when the bolt member 50 is threaded with the internal thread 10d. Specifically, a distal end of the push-up member 15 and a distal end of the piston member 10, which are non-circular and fitted to each other, can be rotated with the push-up member 15 fixed when being fastened by the bolt member 50, and the piston member 10 can be fastened toward the gas generator 17 and can be fastened without being rotated together.

Figure 7:
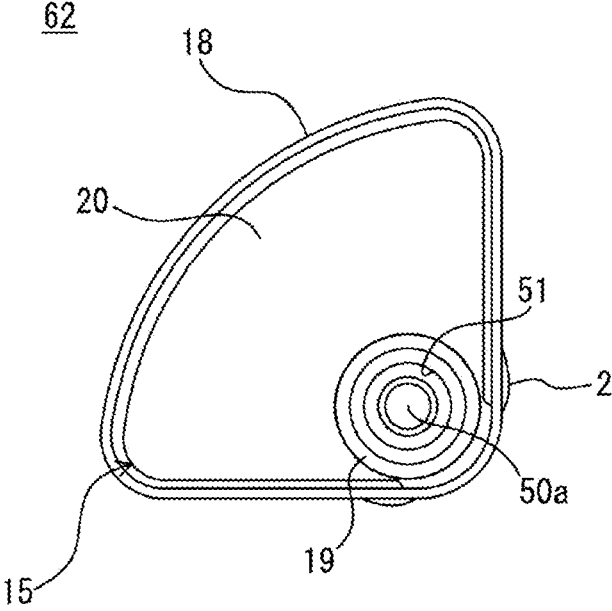
FIG. 7 is a plan view illustrating a state in which a lid and a pilot chute are detached from the pilot chute ejector in FIG. 3.

The support 20 is provided apart from an inner surface of the bottom of the container 18 in an initial state as shown in FIG. 3. As shown in FIG. 7, an outer peripheral portion of the support 20 has a fan shape so as not to contact the inside of the container 18 and so as to conform to an internal shape of the container 18.

The pilot chute 16 is accommodated in the container 18 between an inner surface of the container 18 and an outer surface of the bottomed cylindrical portion 19 of the push-up member 15, for example, so as to surround an inner side of the outer surface of the bottomed cylindrical portion 19 by about half of the circumference. Note that the pilot chute 16 is connected to one end of the coupling member described above, and the other end of the coupling member is connected to the main parachute.

As the gas generator 17, only an igniter may be used, or a gas generator including an igniter and a gas generating agent may be used. Alternatively, a hybrid or a stored gas generator that cleaves a sealing plate in a small gas cylinder by a gunpowder igniter and discharges internal gas to the outside may be used. In this case, as a pressurized gas in the gas cylinder, a non-flammable gas such as argon, helium, nitrogen, or carbon dioxide, or a mixture thereof can be used. In order to reliably propel a piston when the pressurized gas is released, the gas generator may be provided with a heating element including a gas generating agent composition, a thermite composition, or the like.

Note that the piston member 10, the cylinder 14, the push-up member 15, the gas generator 17, and the like mainly constitute the pilot chute ejector 62 that ejects the pilot chute 16.

The trigger device includes, for example, a controller (not shown) including a CPU, a ROM, a RAM, and the like, and an abnormal state determiner (not shown) that determines whether the aerial vehicle 30 is in an abnormal state on the basis of a signal received from a detector (not shown) that detects a state (failure, uncontrollability, flight status (flight orientation, speed, angular velocity, altitude, orientation angle, and the like), a distance from an obstacle, position information, and the like) of the aerial vehicle 30, and can automatically transmit a command signal, an activation signal, and the like to each part in accordance with a situation (for example, in a case where the aerial vehicle 30 is in an abnormal state (in abnormality)), or can receive a command signal and the like from the outside via a communication unit (not shown) and transmit a command signal, an activation signal, and the like to each part. For example, the trigger device has a function of transmitting an automatic start signal for automatically starting the actuator 1 to the actuator 1 in a case where the aerial vehicle 30 is in an abnormal state, and a function of transmitting a startup signal for starting the actuator 1 to the actuator 1 in a case where a trigger signal is received from a remote signal transceiver operated by an operator.

Here, examples of the detector include a signal reception sensor, an acceleration sensor, a gyro sensor, an atmospheric pressure sensor, a global positioning system (GPS), a laser sensor, an ultrasonic sensor, an infrared sensor, a millimeter wave radar, a submillimeter wave radar, a speed sensor, a vision sensor of a single eye or a compound eye, an energy amount sensor, a wind direction detection sensor, and the like, and include at least one or more of the above. Examples of other detectors may include a detector that detects transmission of an emergency signal from an emergency signal transmitter in response to an operation by an operator, a detector that detects a failure of equipment provided in the aerial vehicle 30, and the like.

Furthermore, the "abnormality" described above refers to a case where the abnormal state determiner determines that the aerial vehicle 30 is in an abnormal state (failure, uncontrollability, abnormal fall, or the like) on the basis of a signal from the above-described detector provided in the aerial vehicle 30 or the safety apparatus 100. Specifically, the "abnormality" is a case where the abnormal state determiner determines that any one or more of the following states has occurred: "a loss of signal from the controller of the aerial vehicle 30 for a certain period of time or longer or reception of an abnormality signal from the controller of the aerial vehicle 30"; "a loss of signal from a remote signal transceiver or reception of an abnormal signal from the remote signal transceiver for a certain time or longer"; "when communication with a ground station (including a relay station) is present"; a loss of signal from a ground station for a certain time or longer or reception of an abnormal signal from the ground station, "approach or entry of the aerial vehicle 30 to a prohibited area or deviation from a planned route on the basis of position information of the aerial vehicle 30"; "the remaining level of power (battery) or fuel of the aerial vehicle 30 being less than or equal to a specified value"; "an acceleration of the aerial vehicle 30 being less than or equal to a specified value or greater than or equal to a specified value"; "an angular velocity of the aerial vehicle 30 being greater than or equal to a specified value"; "the orientation angle of the aerial vehicle 30 being a specified value or more (for example, in a state of being inclined by 45° or more with respect to the horizontal)"; "approach to obstacle affecting damage to the aerial vehicle 30 (detection by laser sensor (LiDAR or the like) or an infrared sensor, or detection by a vision sensor and image analysis)"; "the aerial vehicle 30 being a manned vehicle, an emergency state having occurred to a human in the aerial vehicle 30 (detected by an emergency signal transmitted from the emergency signal transmitter"; "a fatal failure of equipment provided in the aerial vehicle 30"; and the like.

Upon determination that the abnormal state determiner determines that the aerial vehicle is in an abnormal state, the trigger device may include a stop unit that can transmit a signal for stopping a propulsion device to the propulsion device and stop the propulsion device.

In the configuration as described above, when the abnormal state determiner determines that an abnormal state has occurred on the basis of a signal from the detector that has detected that, for example, the aerial vehicle or the like equipped with the safety apparatus 100 has fallen, the trigger device transmits a trigger signal to the gas generator 17. When the gas generator 17 which has received the trigger signal is activated, gas is generated. Then, the piston member 10 propels the inside of the cylinder 14 upward by the pressure of the gas generated by the activation. Thus, the push-up member 15 having the bottomed cylindrical portion 19 connected to the rod 10b of the piston member 10 is propelled (projects) upward in the container 18. As a result, the lid 21 is detached, the open end of the container 18 is opened, and the pilot chute 16 is ejected outward (upward on the sheet of FIG. 1 and the sheet of FIG. 3) from inside of the container 18. At this time, the piston member 10 and the tubular member 4 move upward, but the tubular member 4 collides with the stopper member 23 and is plastically deformed. As a result, the influence of the operation of the piston member 10 on the entire safety apparatus 100 is alleviated. In particular, the influence on the push-up member 15 connected to the piston member 10 is alleviated. Then, the pilot chute 16 is deployed after being ejected from the container 18. Subsequently, the main parachute is pulled out from the main parachute storage 63 via the coupling member connected to the pilot chute 16 and then developed.

As described above, in the present embodiment, the pilot chute ejector 62 and the main parachute storage 63 are separately arranged side by side, and the actuator 1 is (1) provided at a position (here, a position at a predetermined distance or more from a portion of the arc of the fan-shaped cross section) shifted from the geometric center of the bottom surface of the container 18, and (2) provided at a position shifted from the center of the entire safety apparatus 60 instead of at the center of the entire safety apparatus 60. Therefore, the present embodiment can provide the safety apparatus 100 that not only has excellent safety performance but can also set an attachment position to the aerial vehicle 30 to a side surface of the airframe 31. In addition, the space between the arc of the fan-shaped cross section and the actuator 1 is larger than in a case where the actuator 1 is installed at the geometric center of the fan-shaped cross section, and thus, the pilot chute 16 can be easily accommodated. That is, as compared with the case where the actuator 1 is installed at the geometric center of the fan-shaped cross section, ease of accommodation of the pilot chute 16 in the container 18 is improved. Furthermore, since the actuator 1 is provided at a position shifted from the center of the entire safety apparatus 60 instead of at the center of the entire safety apparatus 60 so as to be housed in the section 61b of the attachment member 61 separately from the pilot chute ejector 62 (pilot chute 16), the main parachute can be more easily housed than in a case where the attachment member 61 is not divided into sections.

In addition, by setting the attachment position of the safety apparatus 100 to the aerial vehicle 30 to overlap a propulsion direction of the airframe 31 as shown in FIG. 1, air resistance can be reduced more, and more power consumption of the battery or more fuel consumption can be suppressed than in a case where the safety apparatus is attached to a central portion of the upper portion of the airframe of the conventional aerial vehicle.

Second Embodiment

Next, an aerial vehicle including a safety apparatus according to a second embodiment of the present invention will be described with reference to FIGS. 8 to 13. Note that FIG. 9 is also a sectional view taken along line B-B in FIG. 10. Unless otherwise specified, parts similar to those in the first embodiment are denoted by the same reference signs in the last two digits, and the description thereof may be omitted. In the present embodiment, similar components to those in the first embodiment are used unless otherwise specified.

Figure 8:
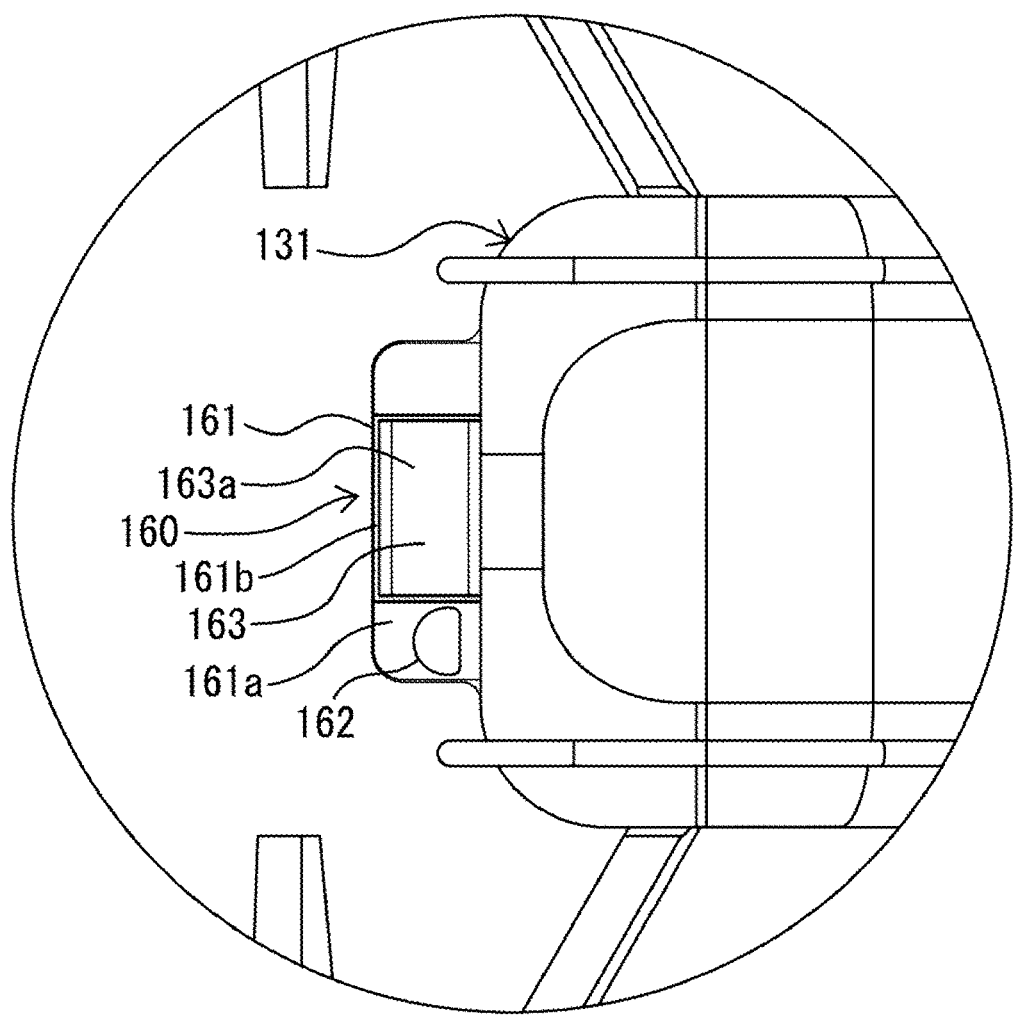
FIG. 8 is an enlarged plan view showing the vicinity of a safety apparatus according to a second embodiment of the present invention in the aerial vehicle to which the safety apparatus is attached.
Figure 9:
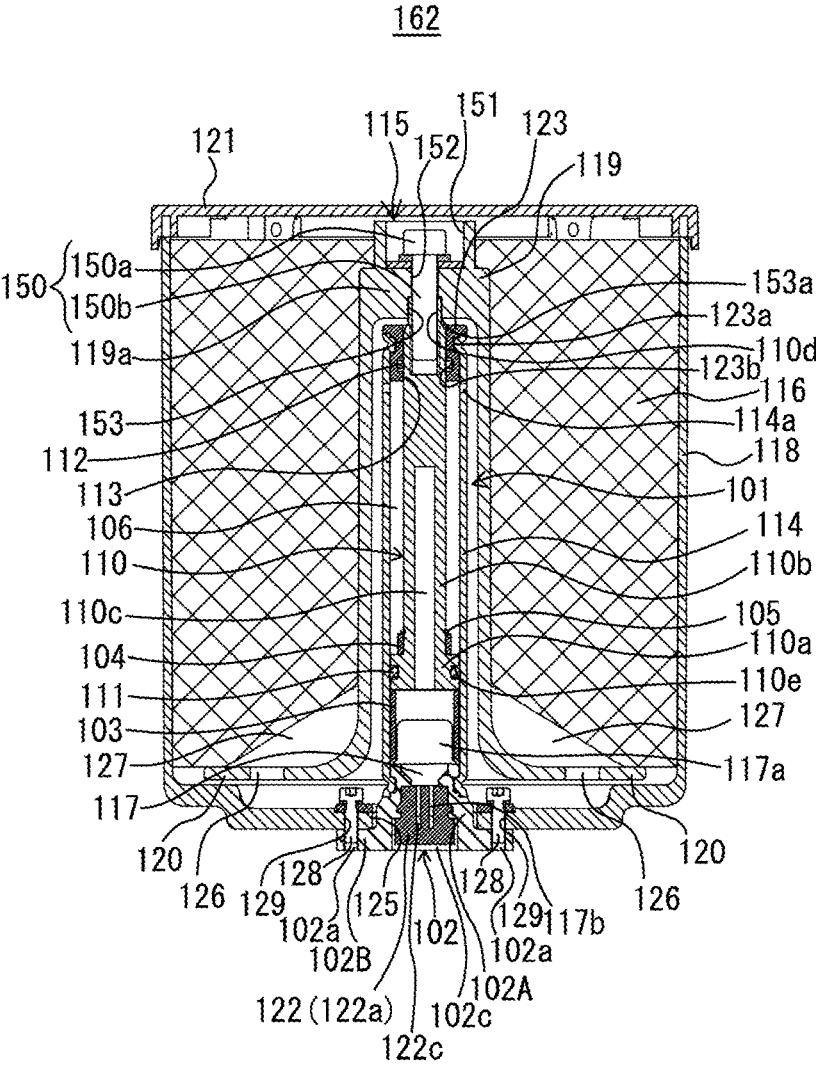
FIG. 9 is a sectional view of a pilot chute ejector of the safety apparatus in FIG. 8.
Figure 10:
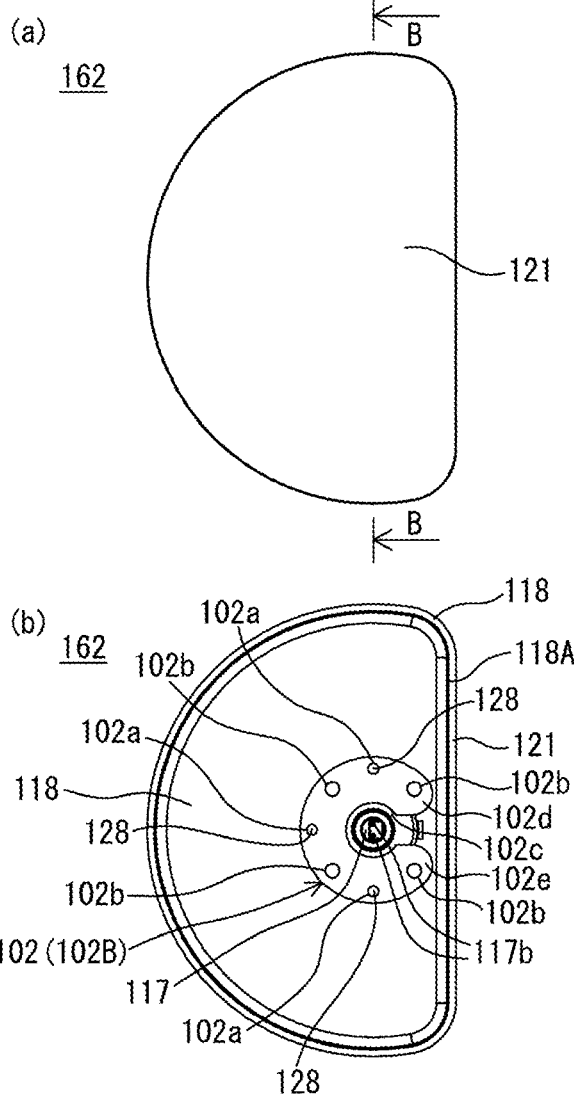
FIG. 10(*a*) is a plan view of the pilot chute ejector in FIG. 8, and FIG. 10(*b*) is a bottom view of the pilot chute ejector in FIG. 8.
Figure 11:
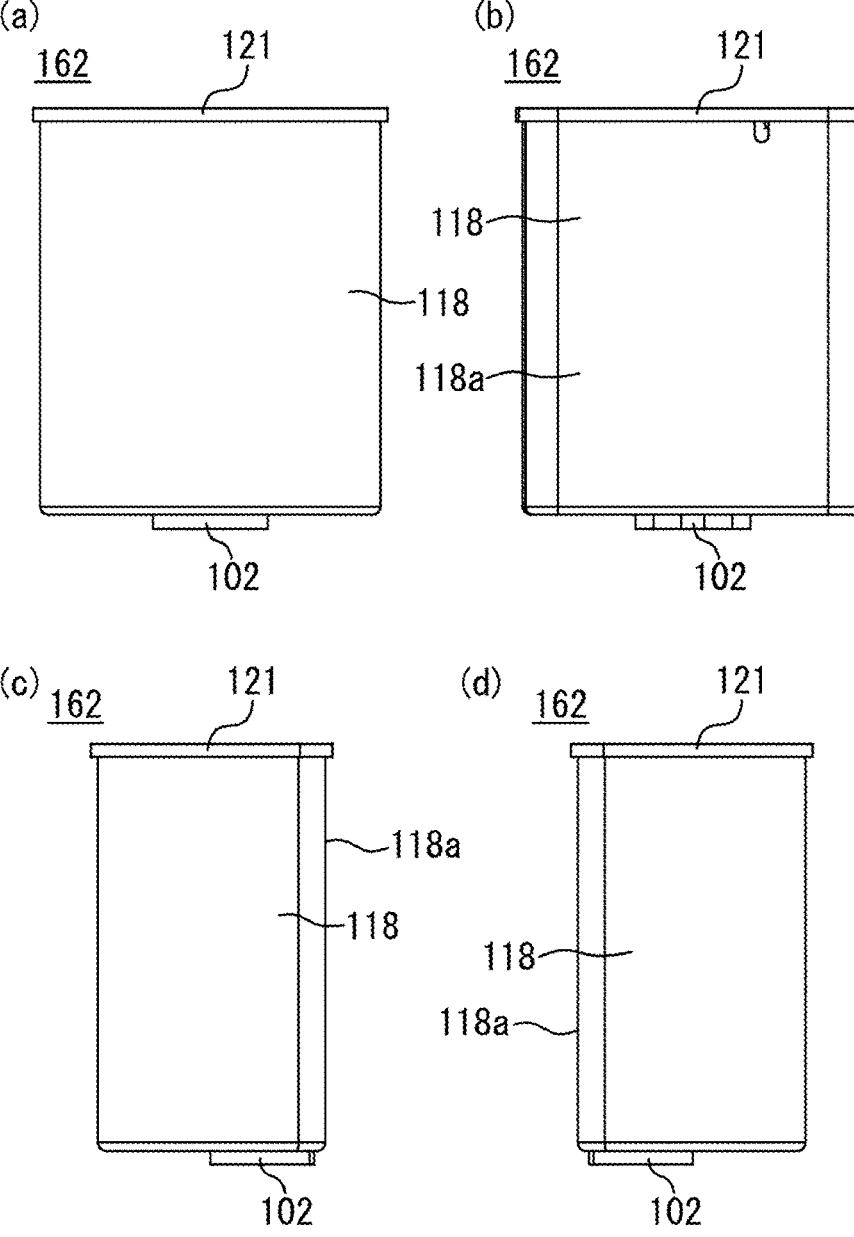
FIG. 11(*a*) is a left side view of the pilot chute ejector in FIG. 8, FIG. 11(*b*) is a right side view of the pilot chute ejector in FIG. 8, FIG. 11(*c*) is a front view of the pilot chute ejector in FIG. 8, and FIG. 11(*d*) is a rear view of the pilot chute ejector in FIG. 8.

The aerial vehicle according to the present embodiment is different from the aerial vehicle according to the first embodiment mainly in that (1) the cross section of a container 162 has a shape approximate to a circular shape partially having a chord (a circular shape partially cut out) (see FIGS. 8, 10, 11, and 12), (2) the shape of a support 120 of a push-up member 115 and the shape of a lid 121 conform to the cross-sectional shape of the container 162 (see FIG. 13), (3) an installation position of an actuator 101 is shifted from a geometric center of the cross section of the container 162 (see FIG. 13), and (4) the support 120 of the push-up member 115 is provided with a vent hole 126 and a movement prevention member 127 (see FIGS. 8 and 9).

Figure 12:
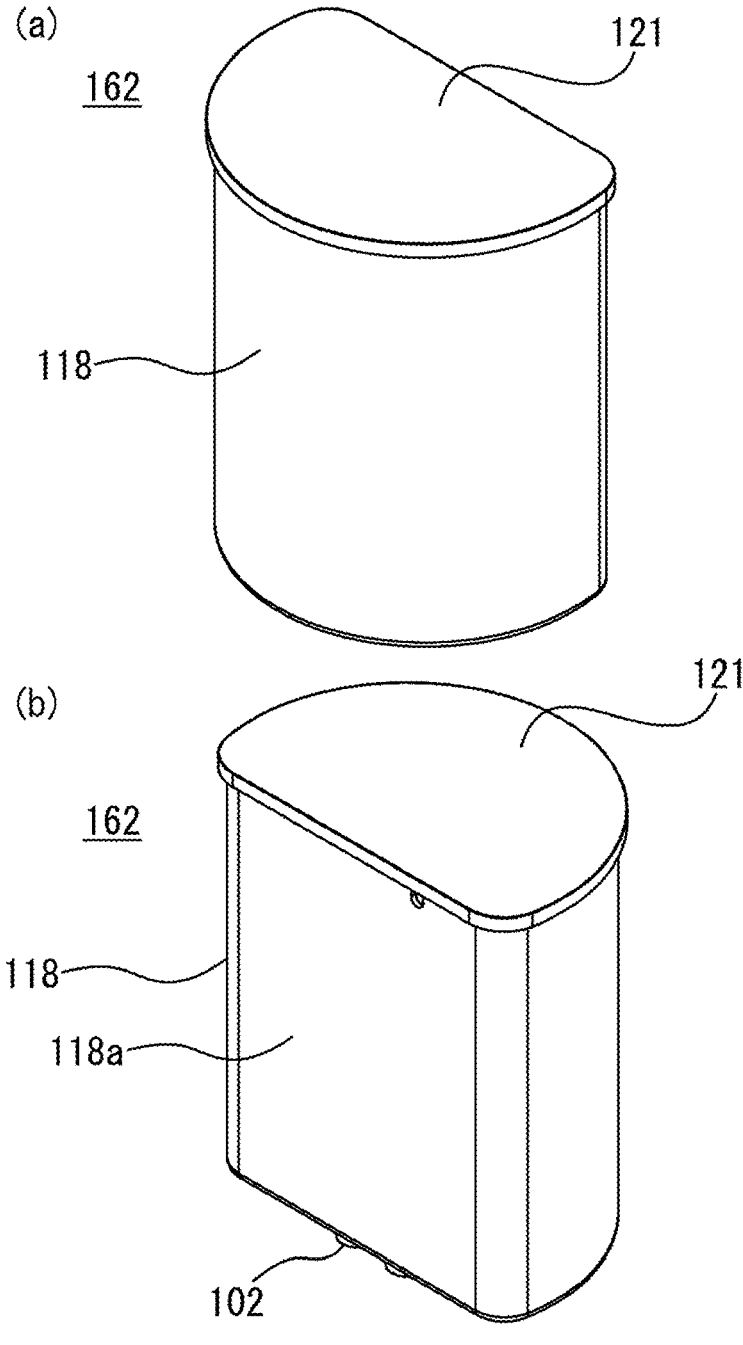
FIG. 12 is a perspective view of the pilot chute ejector in FIG. 8.
Figure 13:
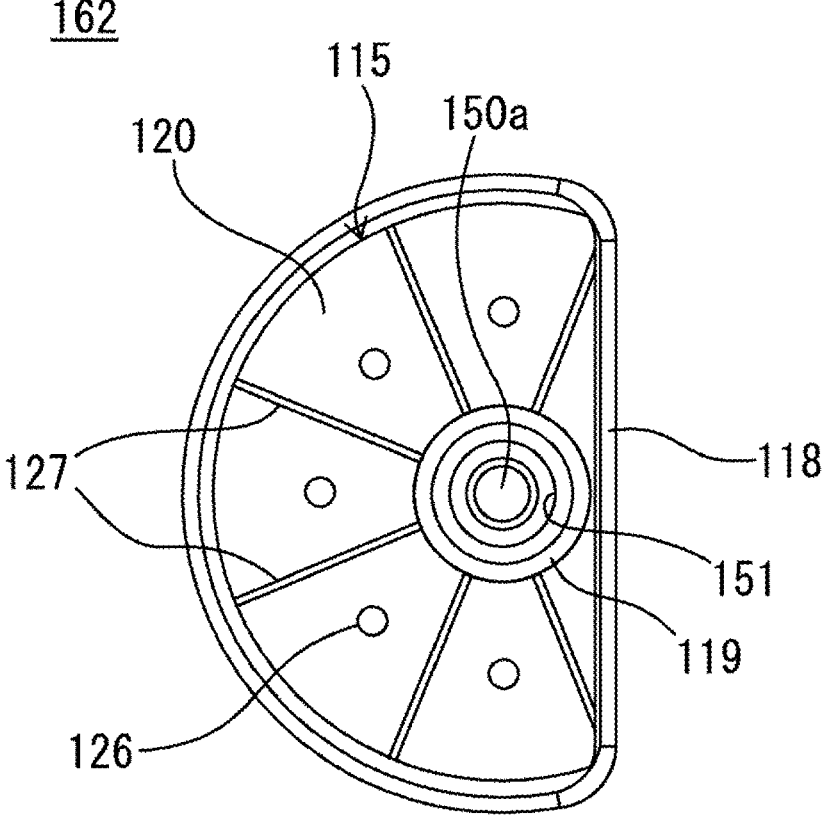
FIG. 13 is a plan view illustrating a state in which a lid and a pilot chute are detached from the pilot chute ejector in FIG. 8.

As described above, the container 162 has a cross section has a shape approximate to a circular shape partially having a chord, but the portion of the container 162 including the chord is a flat portion 118A (see FIG. 12(*b*)). The lid 121 is formed so as to be able to close an opening of the container 162.

The vent hole 126 is provided between the movement prevention members 127 in order to reduce the influence of a negative pressure generated between a bottom of the pilot chute 116 and the support 120 at the time of activation to facilitate the ejection of the pilot chute 116.

The movement prevention member 127 is formed to prevent the pilot chute 116 from moving in a circumferential direction of the bottomed cylindrical portion 119.

As described above, in the present embodiment, similar functions and effects to those of the first embodiment can be obtained, and moreover, the push-up member 115 can be smoothly moved at the time of activation, and the pilot chute 116 can be quickly ejected. In addition, since the movement prevention member 127 can prevent the pilot chute 116 from being displaced in the circumferential direction, the pilot chute can be housed in the container 118 without hindering the deployment at the time of activation.

Third Embodiment

Figure 14:
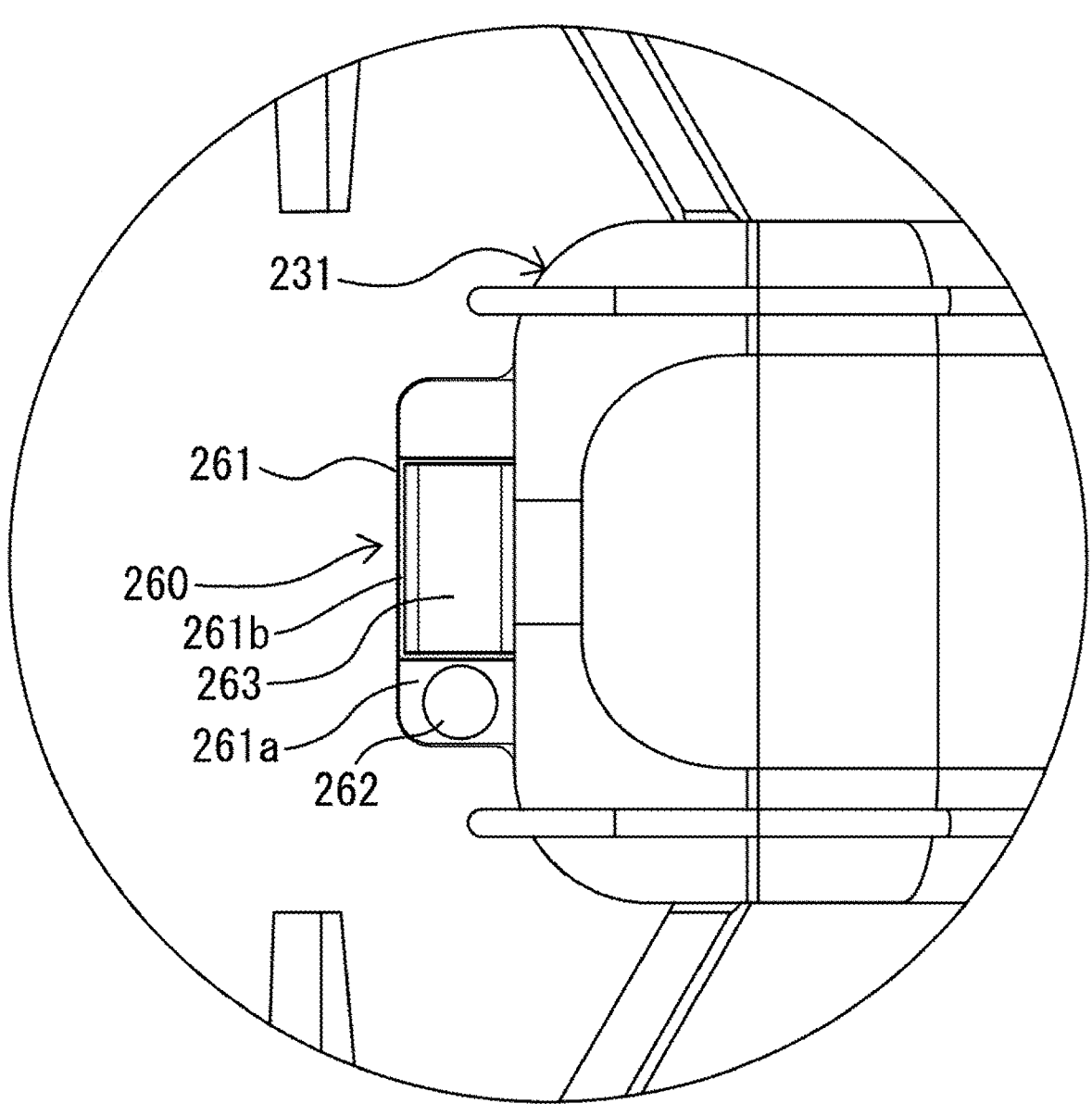
FIG. 14 is an enlarged plan view showing the vicinity of a safety apparatus according to a third embodiment of the present invention in the aerial vehicle to which the safety apparatus is attached.
Figure 15:
FIG. 15 is a sectional view of a pilot chute ejector of the safety apparatus in FIG. 14.
Figure 15:
Figure 16:
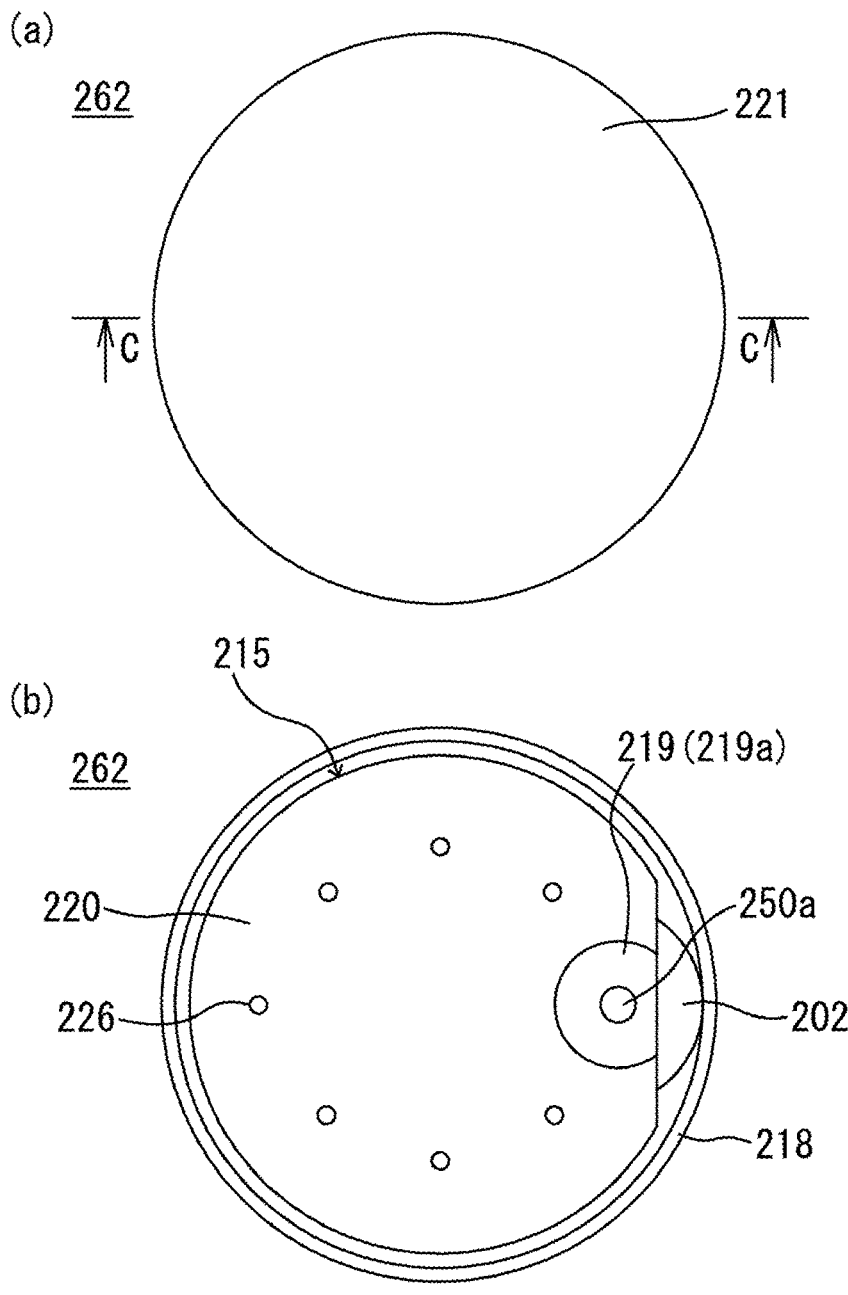
FIG. 16(*a*) is a plan view of the pilot chute ejector in FIG. 14, and FIG. 16(*b*) is a plan view illustrating a state in which a lid and a pilot chute are detached from the pilot chute ejector in FIG. 14.

Next, an aerial vehicle including a safety apparatus according to a third embodiment of the present invention will be described with reference to FIGS. 14 to 16. Note that FIG. 15 is also a sectional view taken along line C-C in FIG. 16. Unless otherwise specified, parts similar to those in the first embodiment are denoted by the same reference signs in the last two digits, and the description thereof may be omitted. In the present embodiment, similar components to those in the first embodiment are used unless otherwise specified.

The aerial vehicle according to the present embodiment is different from the aerial vehicle according to the first or second embodiment in that the cross section of a container 262 has a circular shape (see FIGS. 14 and 16), (2) the shape of a support 220 of a push-up member 215 and the shape of a lid 221 conform to the cross-sectional shape of the container 262 (see FIG. 16), (3) the installation position of an actuator 201 is shifted from the geometric center of the cross section of the container 262 (see FIG. 15), (4) a vent hole 226 is formed in the support 220 of the push-up member 215 (see FIGS. 15 and 16), and (5), a vent hole 224 is formed in a bottom surface of a container 218 and a vent hole 225 is formed in a side surface of the container 218 (see FIG. 15).

The support 220 has a shape that substantially conforms to the cross-sectional shape of the container 262, but is formed so as to have a missing part close to the actuator 201 disposed at a position deviated from the geometric center of the cross section of the container 262.

As described above, in the present embodiment, similar functions and effects to those of the first embodiment can be obtained, and moreover, the push-up member 115 can be smoothly moved at the time of activation, and the pilot chute 116 can be quickly ejected.

The embodiments of the present invention have been described above with reference to the drawings. However, the specific configuration of the present invention should not be interpreted as to be limited to the embodiment. The scope of the present invention is defined not by the above embodiments but by claims set forth below, and shall encompass the equivalents in the meaning of the claims and every modification within the scope of the claims. For example, the present invention includes the following modifications.

In the safety apparatus according to each of the above embodiments, the bottom of the container is fixed to the airframe of the aerial vehicle via the attachment member. However, the bottom may be directly fixed to the airframe or the attachment member by means such as a rubber band, a belt, a string, or the like (mechanical bonding, bolt, fastener, or adhesive). For example, pilot chute ejectors according to modifications illustrated in FIGS. 17 to 28 may be used. Hereinafter, each of the modifications will be described. Unless otherwise specified, parts similar to those in the first embodiment are denoted by the same reference signs in the last two digits, and the description thereof may be omitted. In Modifications 1 and 2, similar components to those in the first embodiment are used unless otherwise specified. In Modifications 3 and 4, similar components to those in the second embodiment are used unless otherwise specified.

<Modification 1>

Figure 17:
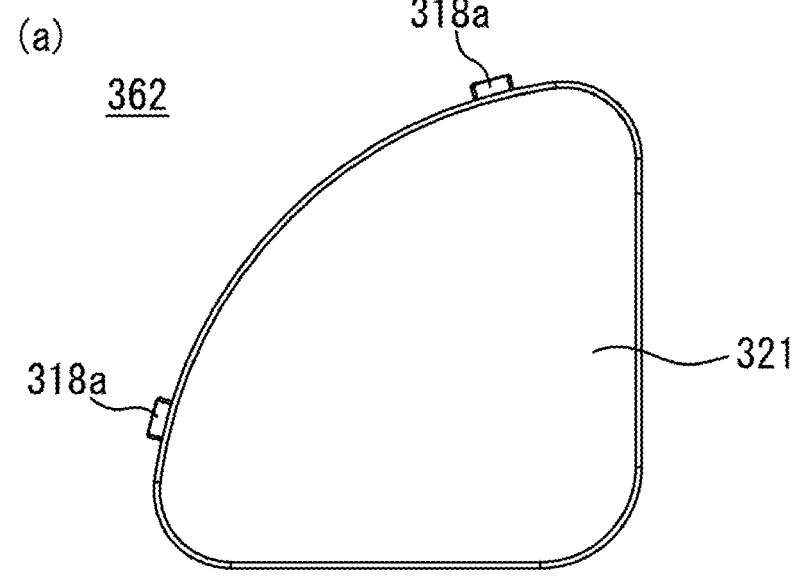
FIG. 17(*a*) is a plan view of a pilot chute ejector according to Modification 1, and FIG. 17(*b*) is a bottom view of the pilot chute ejector according to Modification 1.
Figure 17:
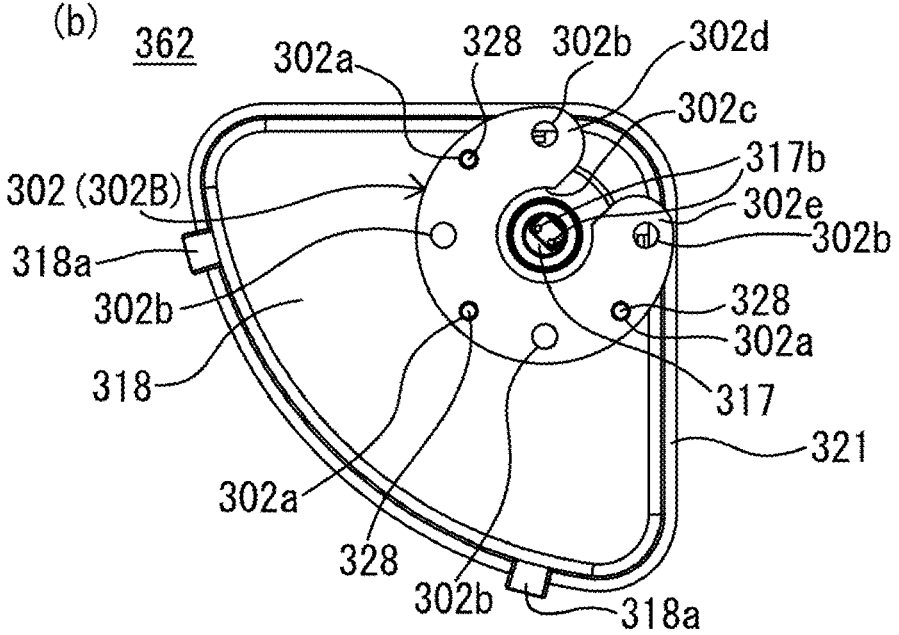
Figure 18:
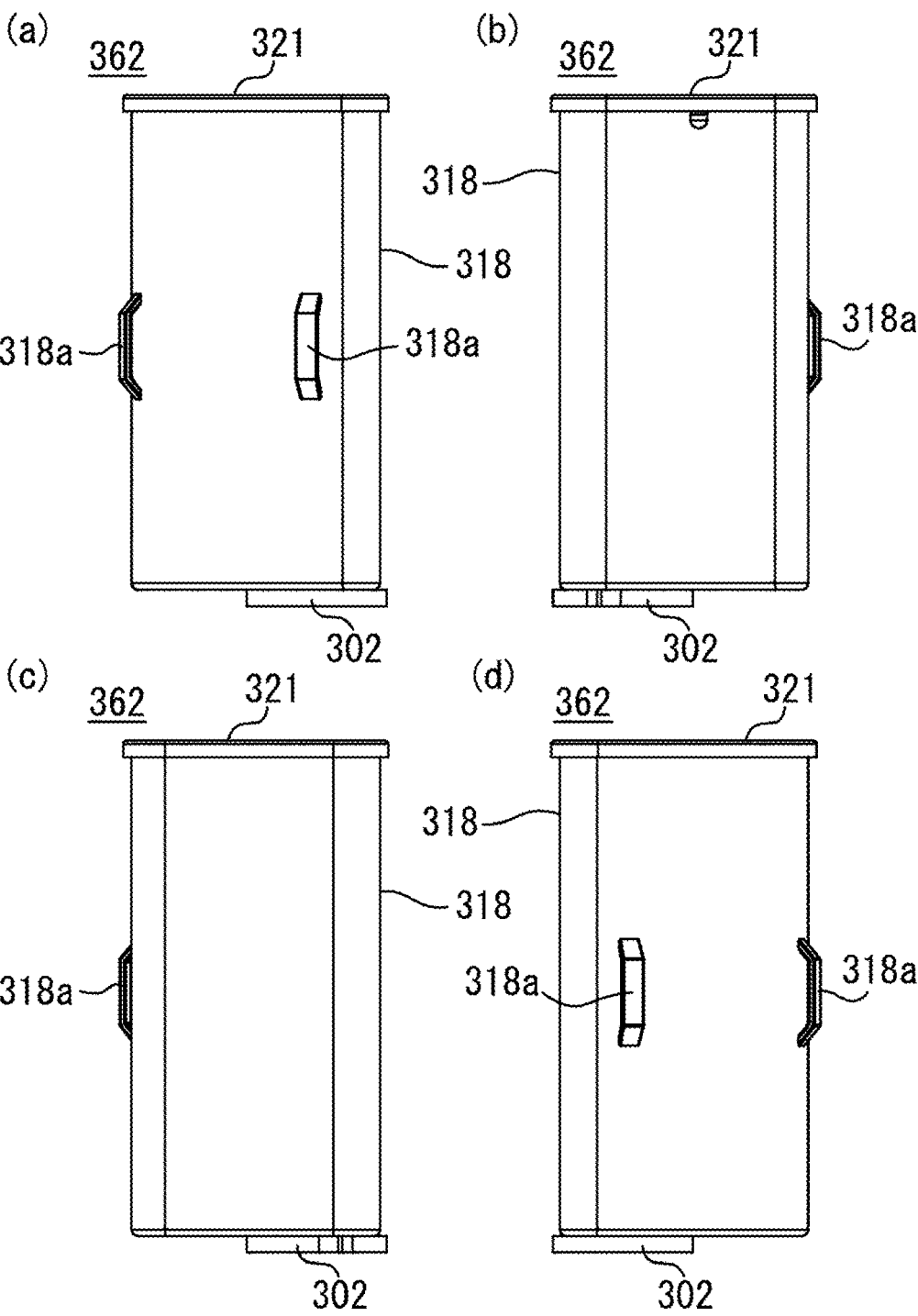
FIG. 18 are views of the pilot chute ejector according to Modification 1, in which FIG. 18(*a*) is a left side view, FIG. 18(*b*) is a right side view, FIG. 18(*c*) is a front view, and FIG. 18(*d*) is a rear view.
Figure 19:
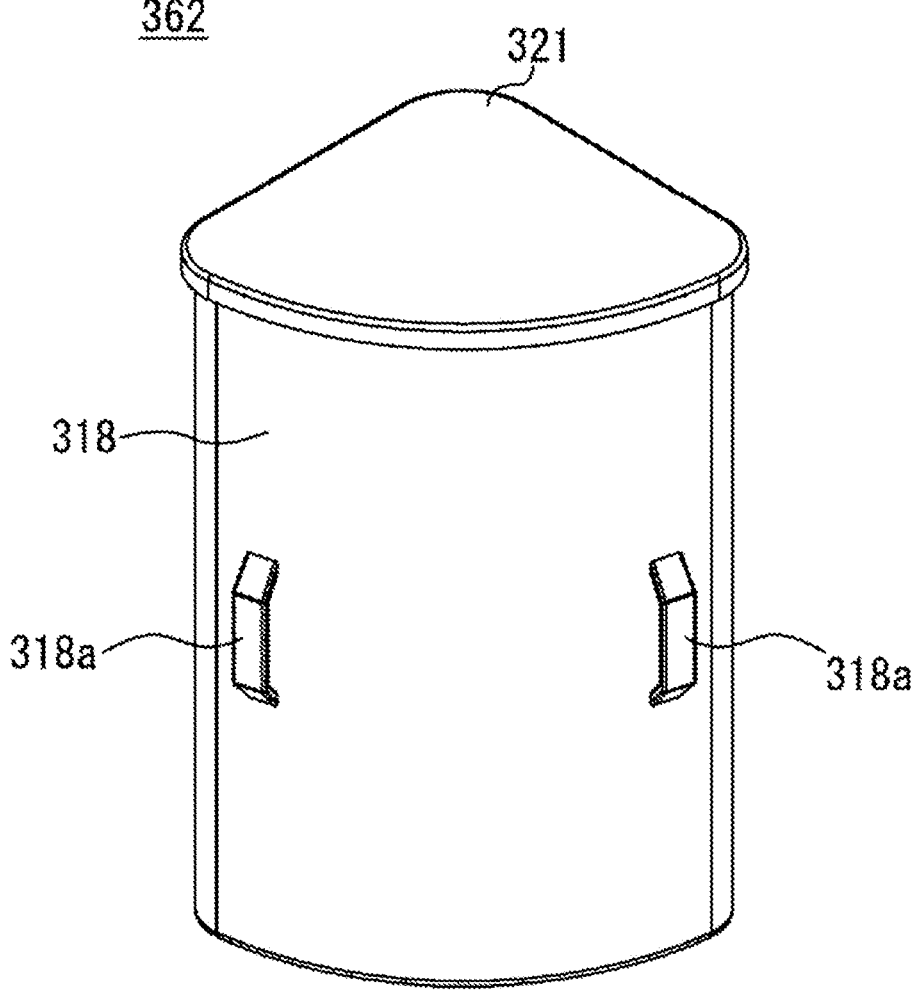
FIG. 19 is a perspective view of the pilot chute ejector according to Modification 1.

A pilot chute ejector 362 shown in FIGS. 17 to 19 is different from the pilot chute ejector according to the first embodiment in that a plurality of belt holders 318a that can hold therethrough a belt member (not shown) for fixing to the aerial vehicle (not shown) or the attachment member (not shown) is provided outside a housing 318. Specifically, two belt holders 318a are provided in parallel along a circumferential direction of the fan-shaped curved surface outside the housing 318. Thus, the pilot chute ejector 362 can be fixed to the aerial vehicle or the attachment member by fastening a belt passed through the belt holders 318a to the aerial vehicle or the attachment member.

<Modification 2>

Figure 20:
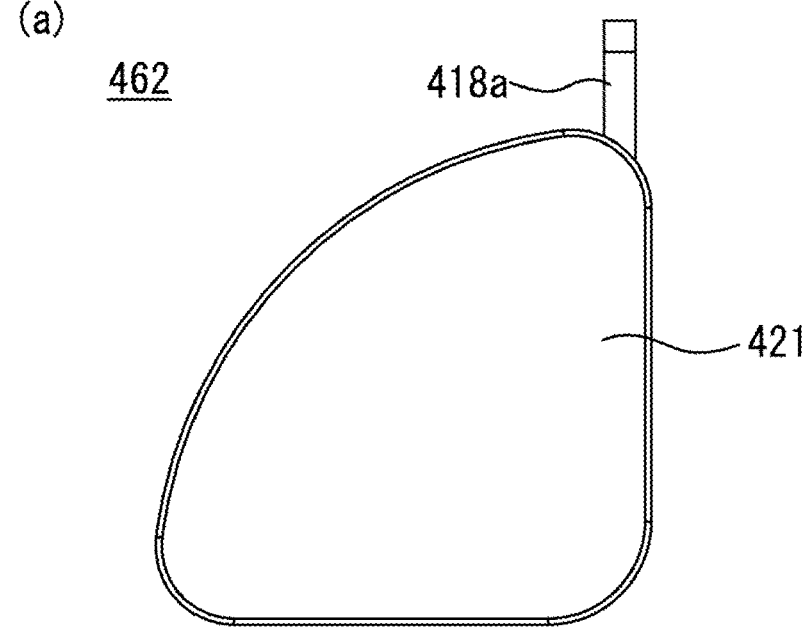
FIG. 20(*a*) is a plan view of a pilot chute ejector according to Modification 2, and FIG. 20(*b*) is a bottom view of the pilot chute ejector according to Modification 2.
Figure 20:
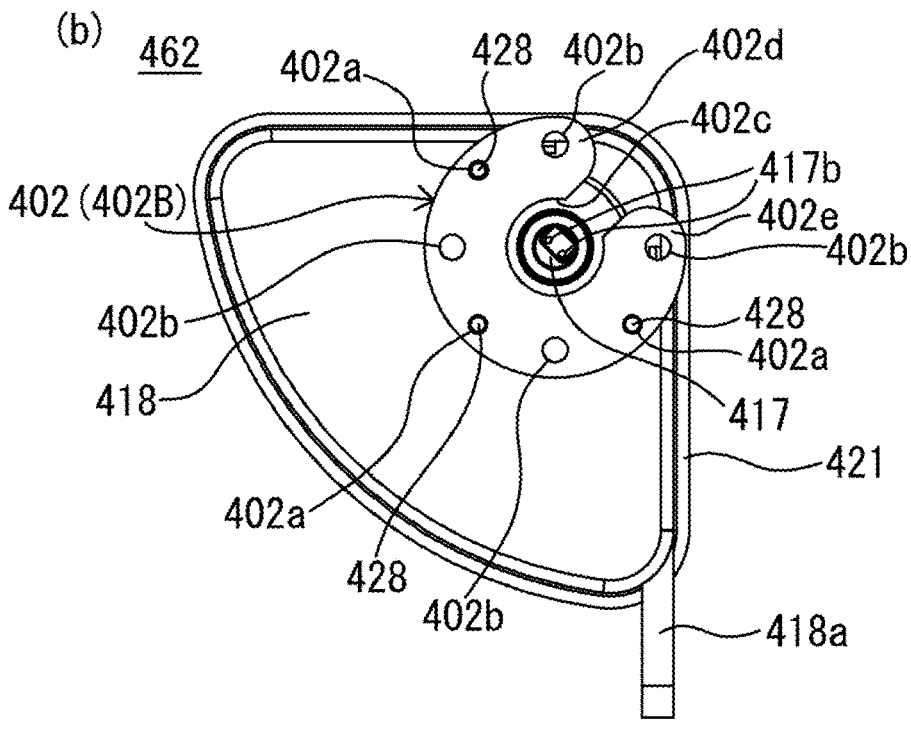
Figure 21:
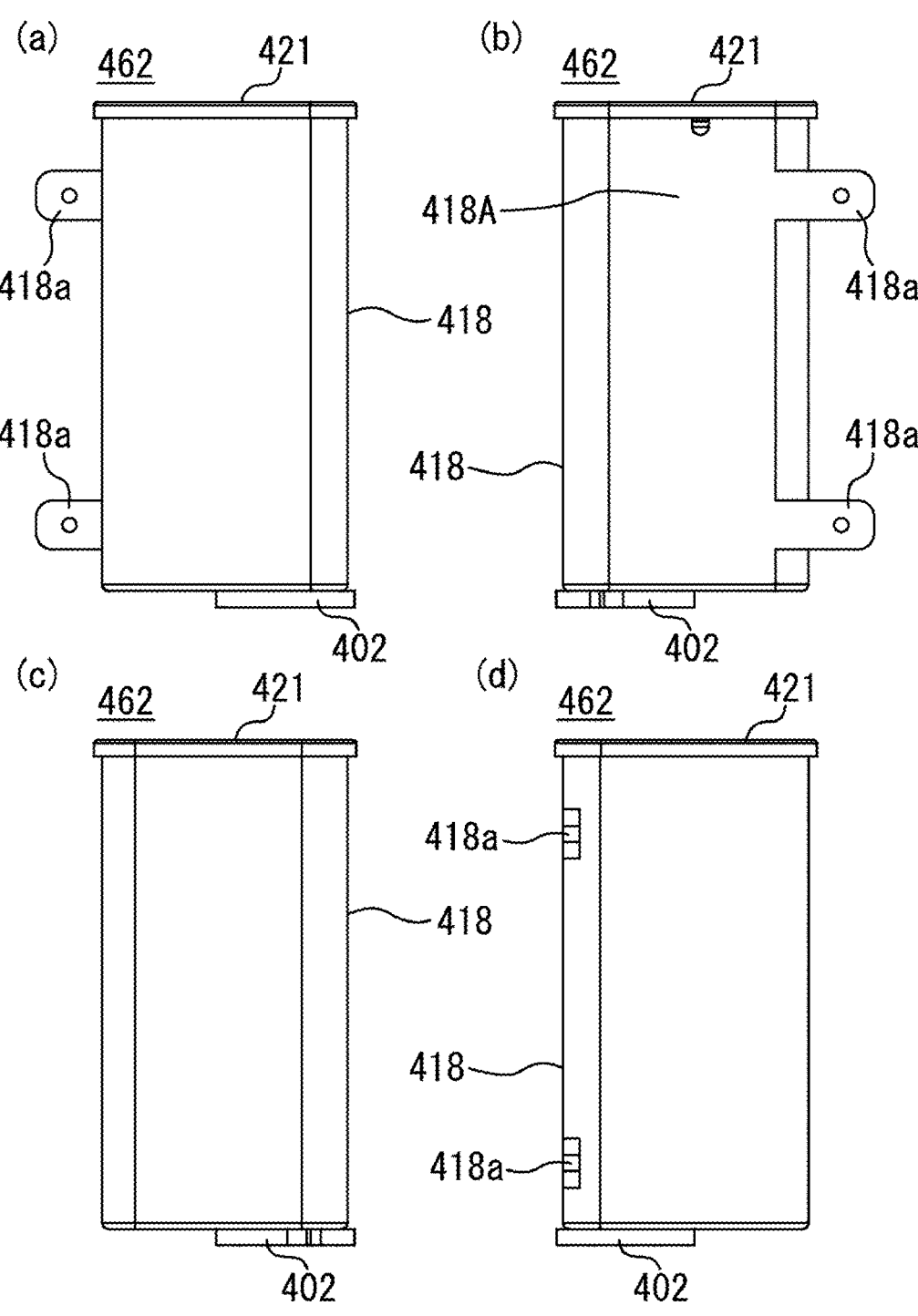
FIG. 21 are views of the pilot chute ejector according to Modification 2, in which FIG. 21(*a*) is a left side view, FIG. 21(*b*) is a right side view, FIG. 21(*c*) is a front view, and FIG. 21(*d*) is a rear view.
Figure 22:
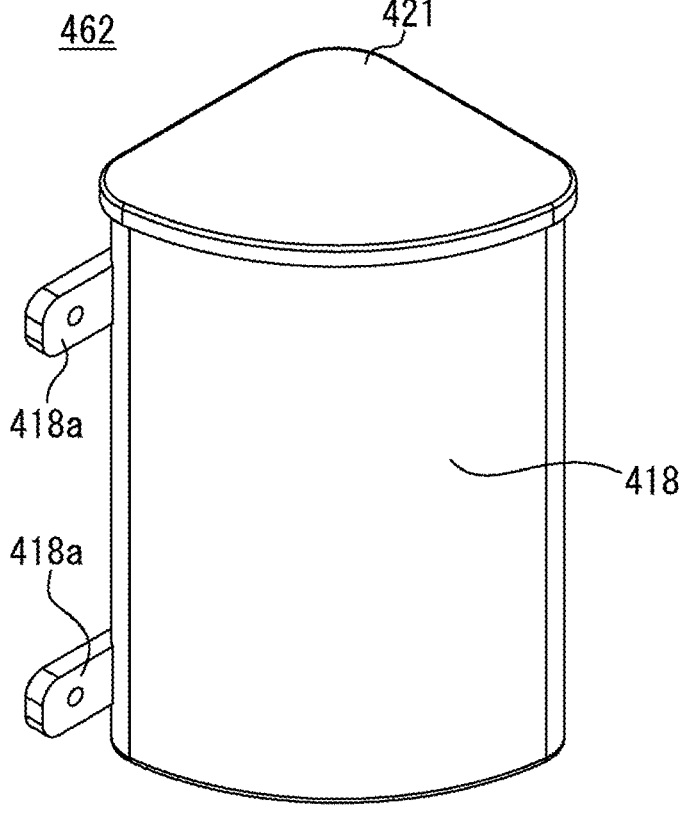
FIG. 22 is a perspective view of the pilot chute ejector according to Modification 2.

A pilot chute ejector 462 shown in FIGS. 20 to 22 is different from the pilot chute ejector according to the first embodiment in that a plurality of holders 418a each having a through hole into which a bolt is inserted is provided outside a housing 418. Specifically, as shown in FIG. 21(*b*), the holder 418*a* is integrally formed with a flat portion 418A on a right side surface, and the pilot chute ejector 462 can be fixed to the aerial vehicle or the attachment member by inserting a bolt into the through hole and screwing the bolt into a hole (not shown) provided in the aerial vehicle (not shown) or the attachment member (not shown).

<Modification 3>

Figure 23:
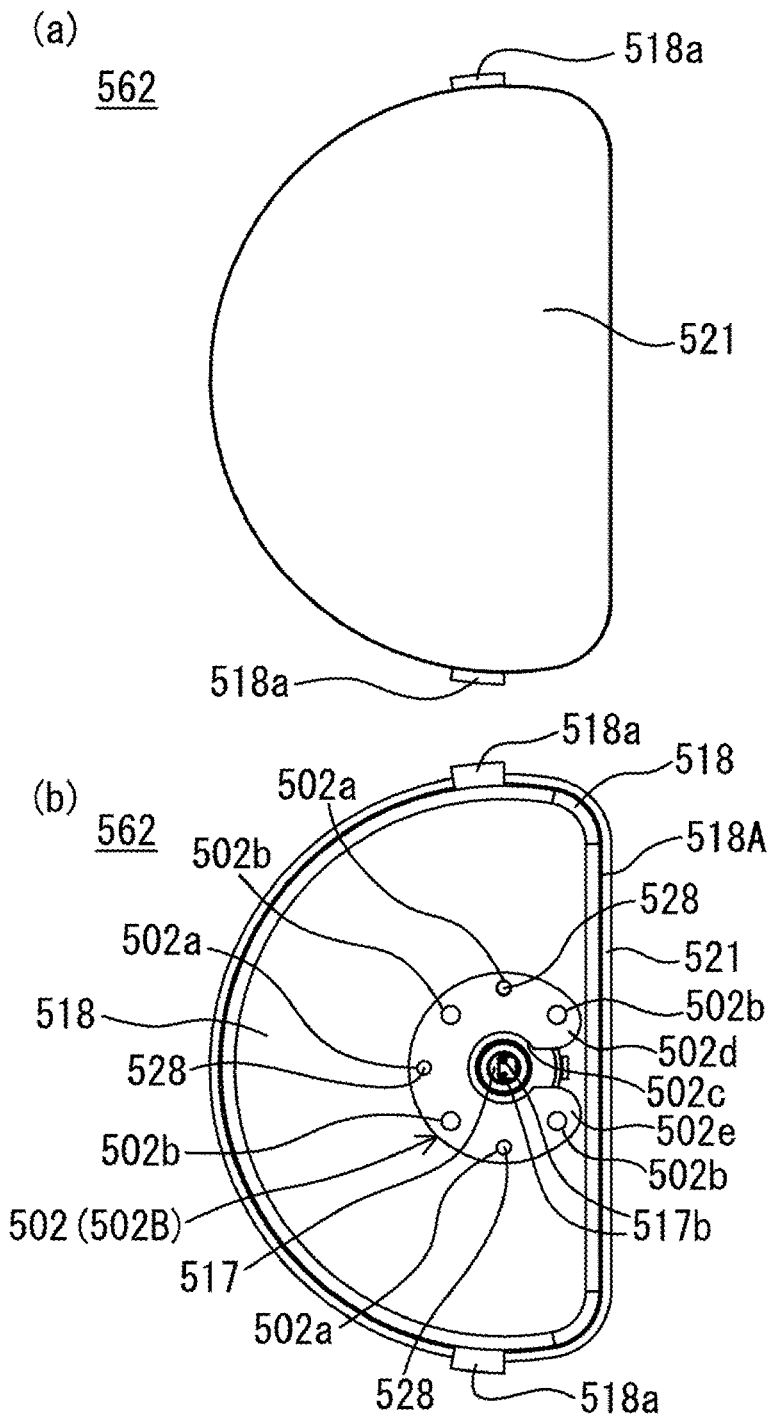
FIG. 23(*a*) is a plan view of a pilot chute ejector according to Modification 3, and FIG. 23(*b*) is a bottom view of the pilot chute ejector according to Modification 3.
Figure 24:
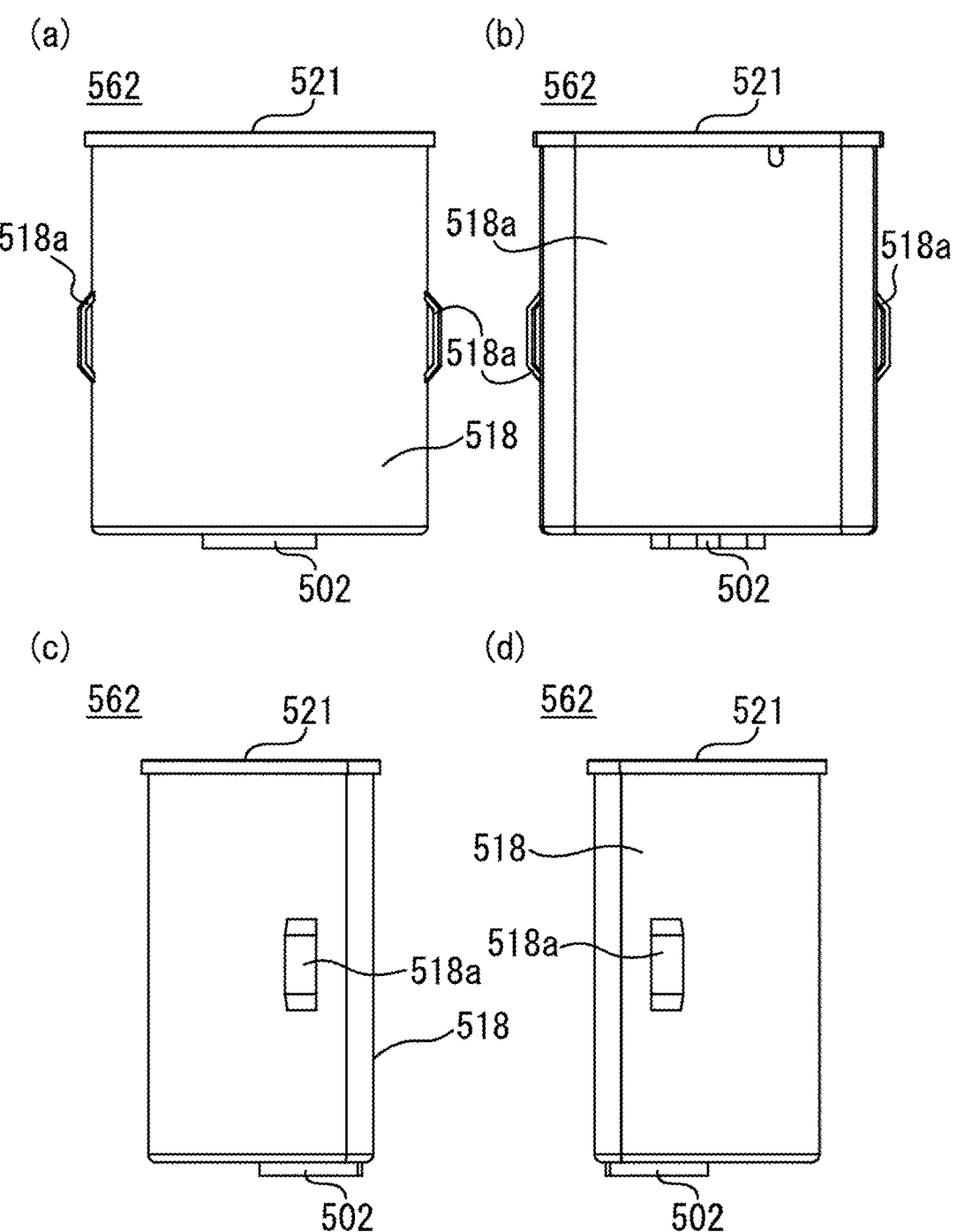
FIG. 24 are views of the pilot chute ejector according to Modification 3, in which FIG. 24(*a*) is a left side view, FIG. 24(*b*) is a right side view, FIG. 24(*c*) is a front view, and FIG. 24(*d*) is a rear view.
Figure 25:
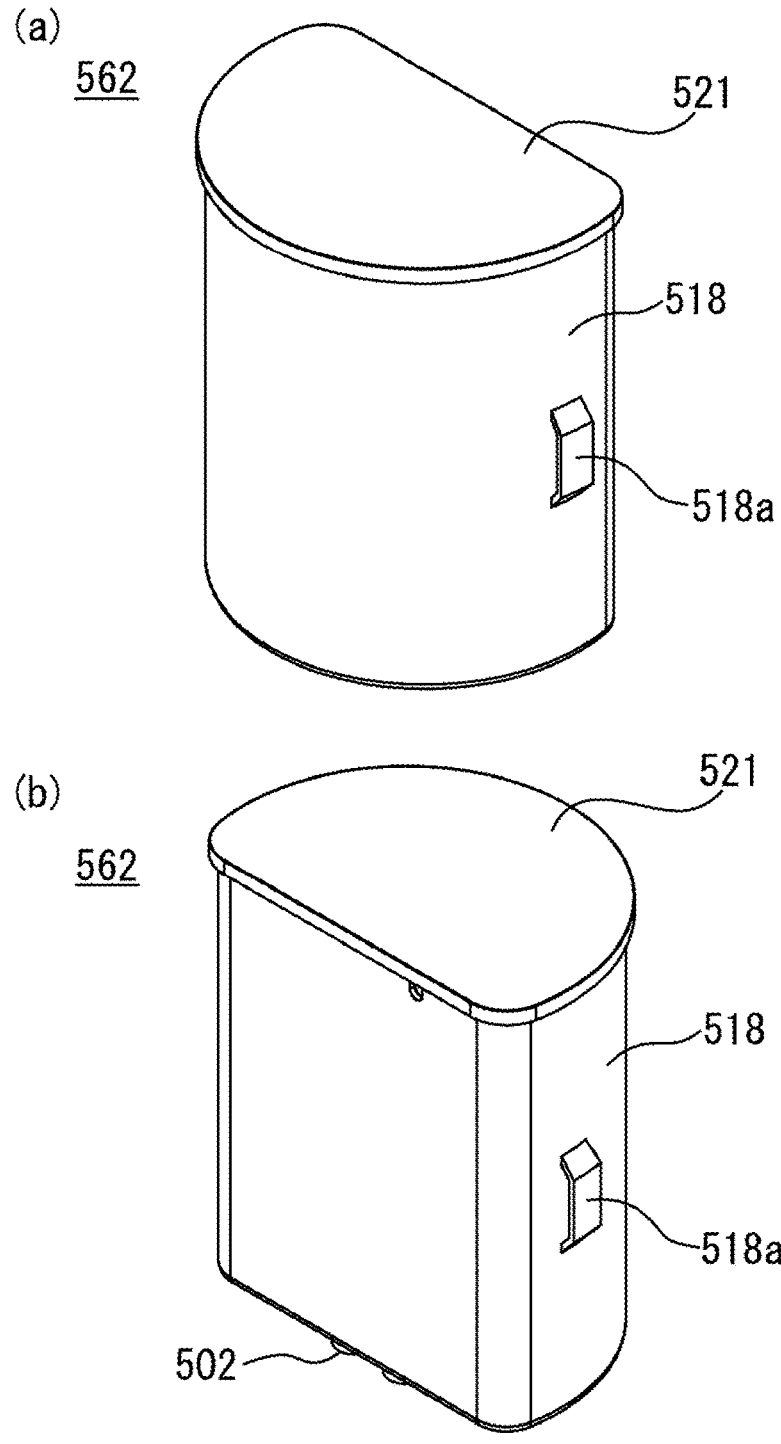
FIG. 25 is a perspective view of the pilot chute ejector according to Modification 3.

A pilot chute ejector 562 shown in FIGS. 23 to 25 is different from the pilot chute ejector according to the second embodiment in that a plurality of belt holders 518*a* that can hold therethrough a belt (not shown) for fixing to the aerial vehicle (not shown) or the attachment member (not shown) is provided outside a housing 518. Specifically, two belt holders 518*a* are provided in parallel along a circumferential direction of the fan-shaped curved surface outside the housing 518. Thus, the pilot chute ejector 562 can be fixed to the aerial vehicle or the attachment member by fastening a belt passed through the belt holders 518*a* to the aerial vehicle or the attachment member.

<Modification 4>

Figure 26:
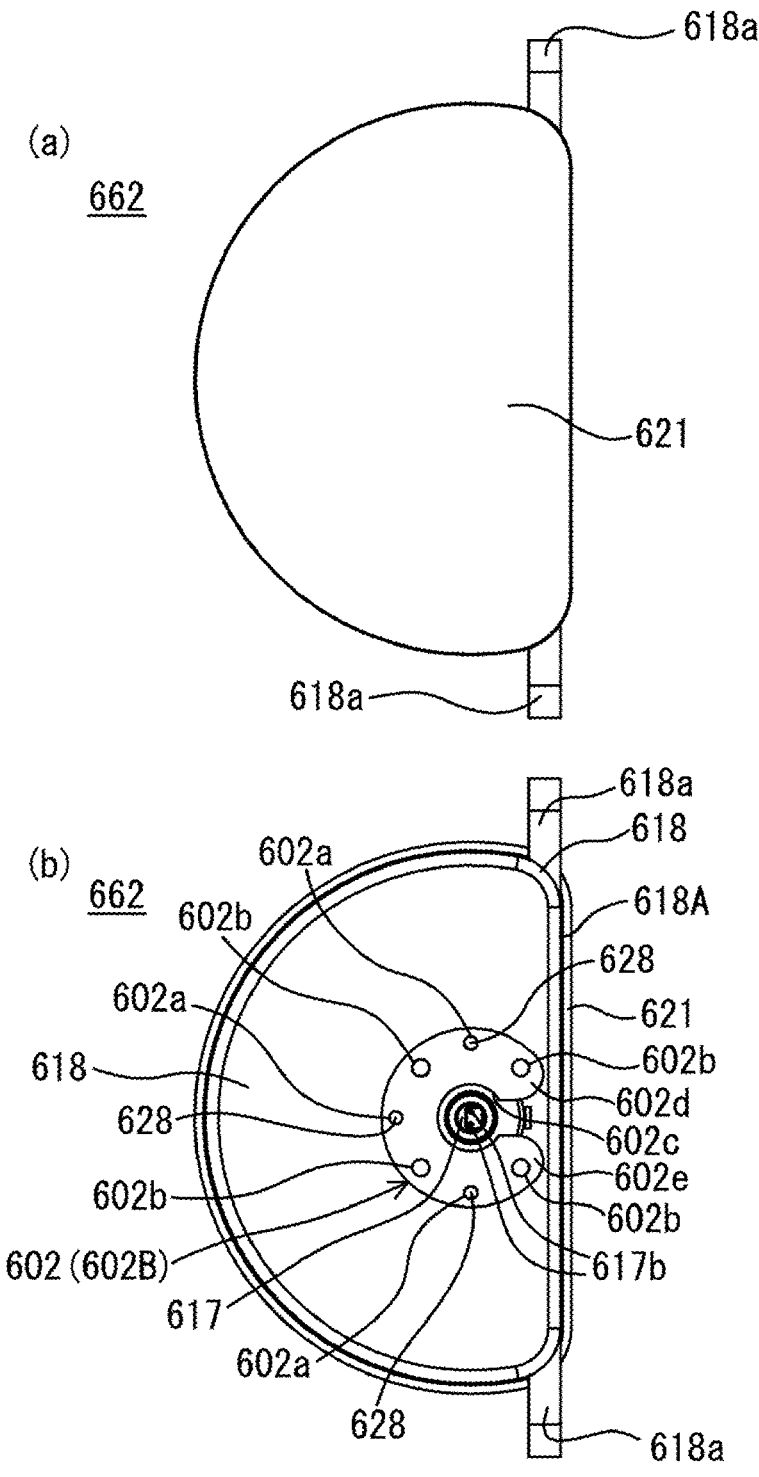
FIG. 26(*a*) is a plan view of a pilot chute ejector according to Modification 4, and FIG. 26(*b*) is a bottom view of the pilot chute ejector according to Modification 4.
Figure 27:
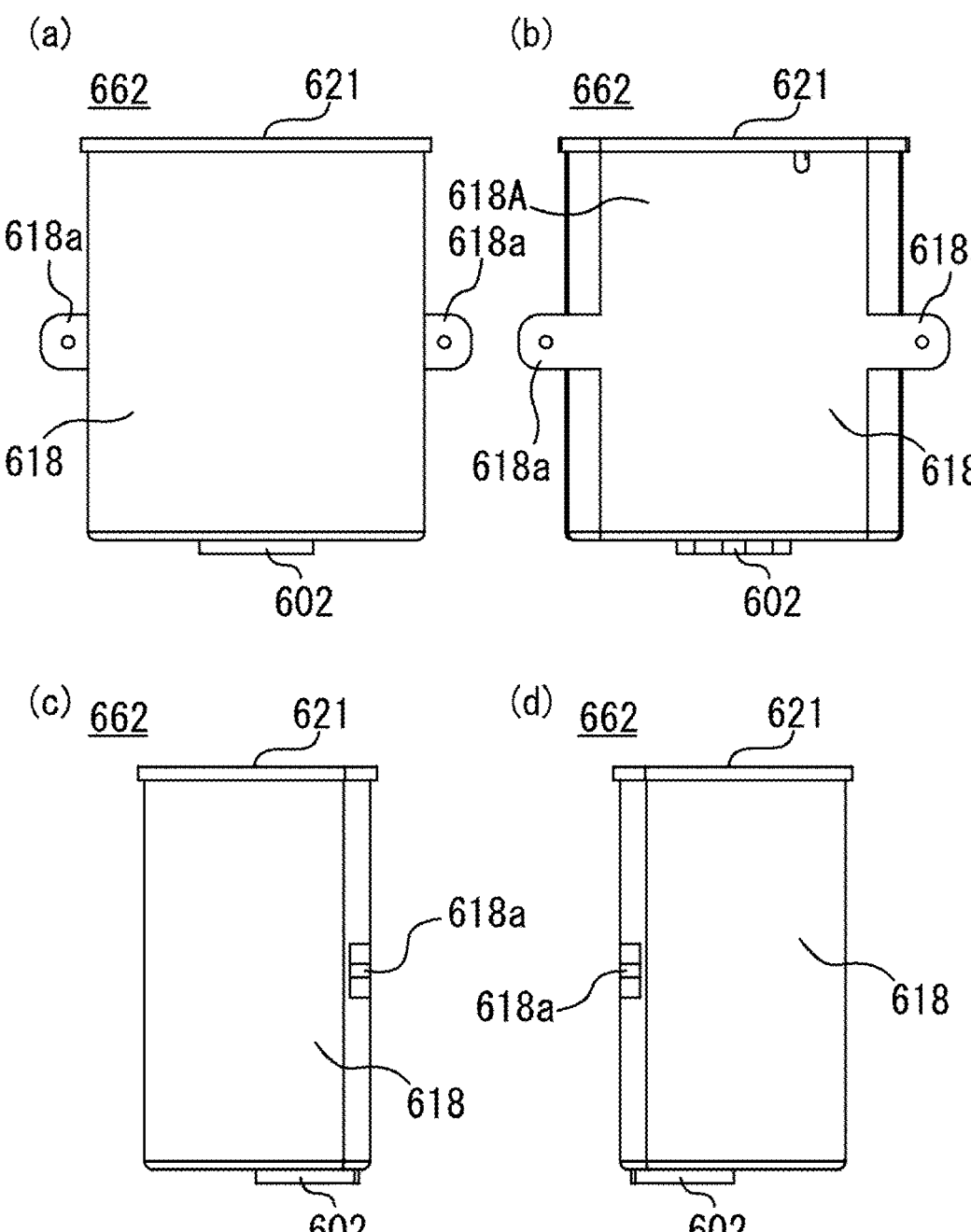
FIG. 27 are views of the pilot chute ejector according to Modification 4, in which FIG. 27(*a*) is a left side view, FIG. 27(*b*) is a right side view, FIG. 27(*c*) is a front view, and FIG. 27(*d*) is a rear view.
Figure 28:
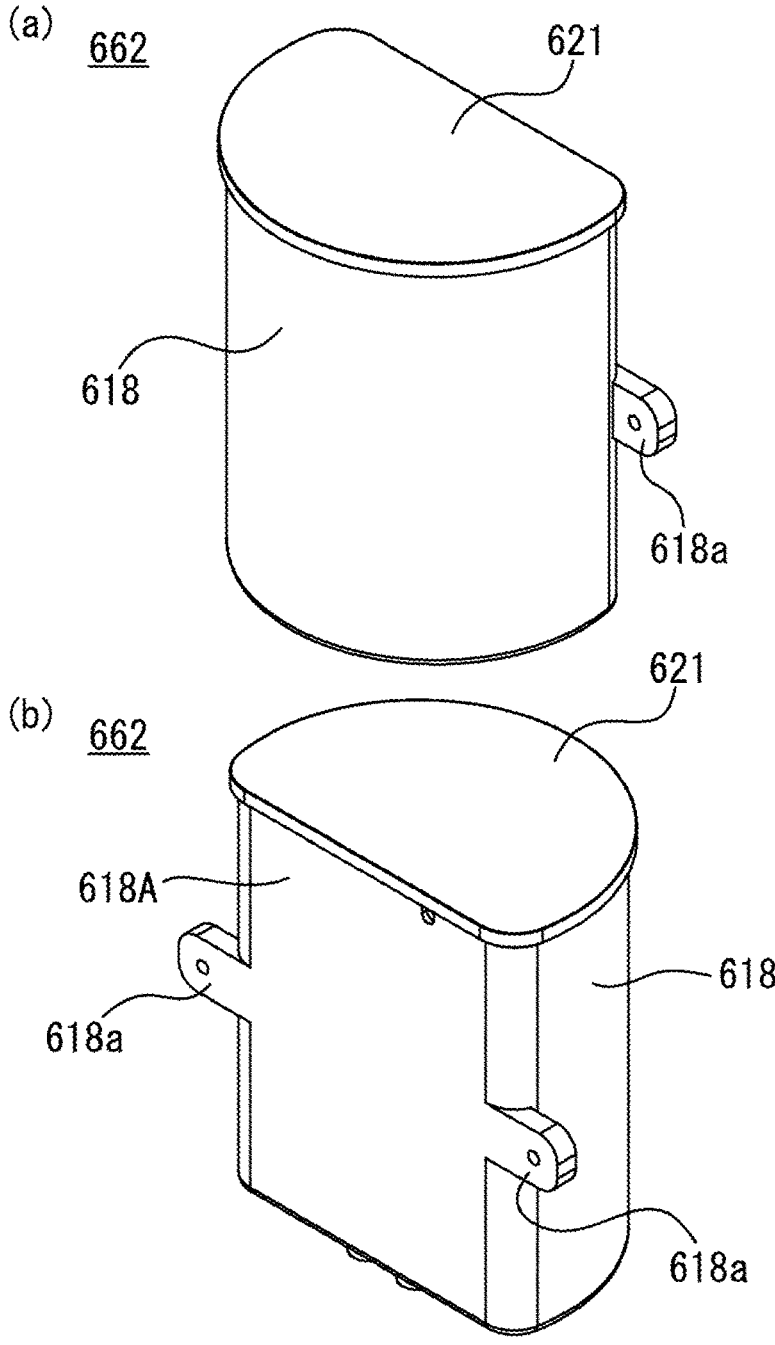
FIG. 28 are perspective views of the pilot chute ejector according to Modification 4, in which FIG. 29(*a*) mainly shows a curved surface, and FIG. 29(*b*) mainly shows a side opposite to the curved surface.

A pilot chute ejector 662 shown in FIGS. 26 to 28 is different from the pilot chute ejector according to the second embodiment in that a plurality of holders 618*a* each having a through hole into which a bolt is inserted is provided outside a housing 618. Specifically, as shown in FIG. 27(*b*), the holder 618*a* is integrally formed with a flat portion 618A on a right side surface, and the pilot chute ejector 662 can be fixed to the aerial vehicle by inserting a bolt into the through hole and screwing the bolt into a hole (not shown) provided in the aerial vehicle (not shown) or the attachment member (not shown).

<Modification 5>

Figure 29:
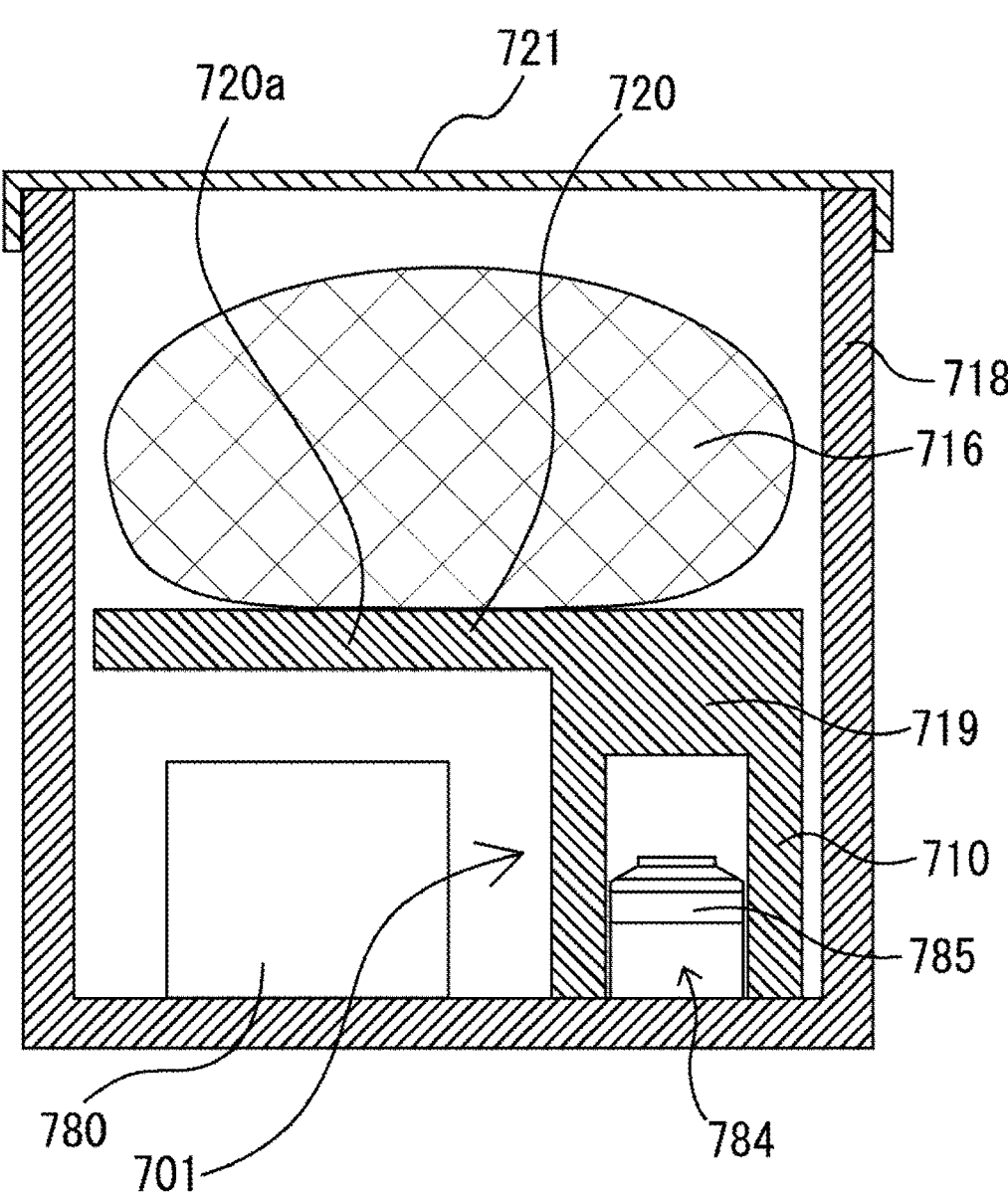
FIG. 29 is a sectional view of a pilot chute ejector according to Modification 5.

Alternatively, a pilot chute ejector 762 according to a modification illustrated in FIG. 29 may be used. In the specific description below, unless otherwise specified, parts similar to those in the first embodiment are denoted by the same reference signs in the last two digits, and the description thereof is omitted.

The pilot chute ejector 762 includes an actuator 701 and a pilot chute 716. The actuator 701 includes an igniter 784 having a cup-shaped case 785 that accommodates an ignition agent (not shown), a piston member 710 that is a part of a bottomed cylindrical portion 719, a support 720 having a flange-shaped portion 720*a* formed to protrude in a radial direction from a side of the piston member 710, a bottomed cylindrical container 718 that regulates a propulsion direction of the piston member 710 via an outer edge of the support 720, and equipment 780. The pilot chute 716 is housed in the container 718 in a state of being disposed on the support 720. In addition, because of an external shape of the igniter 784, the igniter 784 also has a function of a cylinder that slidably supports the piston member 710 in a direction of a lid 721 provided in an opening of the container 718 from an initial state (see FIG. 29) at the time of activation. Examples of the equipment 780 include a trigger device similar to the trigger device according to the first embodiment, or various equipment and devices such as an abnormality detection device and a control device. In such a configuration, when the igniter 784 is activated, the pilot chute 716 can be directly pushed out and developed by the propulsion of the piston member 710 which is upward on the sheet of FIG. 29. Note that an opening end of the container 718 is closed by a lid 721 in an initial state, and the lid 721 is detached from the opening end by pushing out the pilot chute 716.

This modification exerts similar effects to those of the first embodiment. Since a sufficient space can be provided between the container 718 and the actuator 701, the equipment 780 can be easily installed.

<Modification 6>

Figure 30:
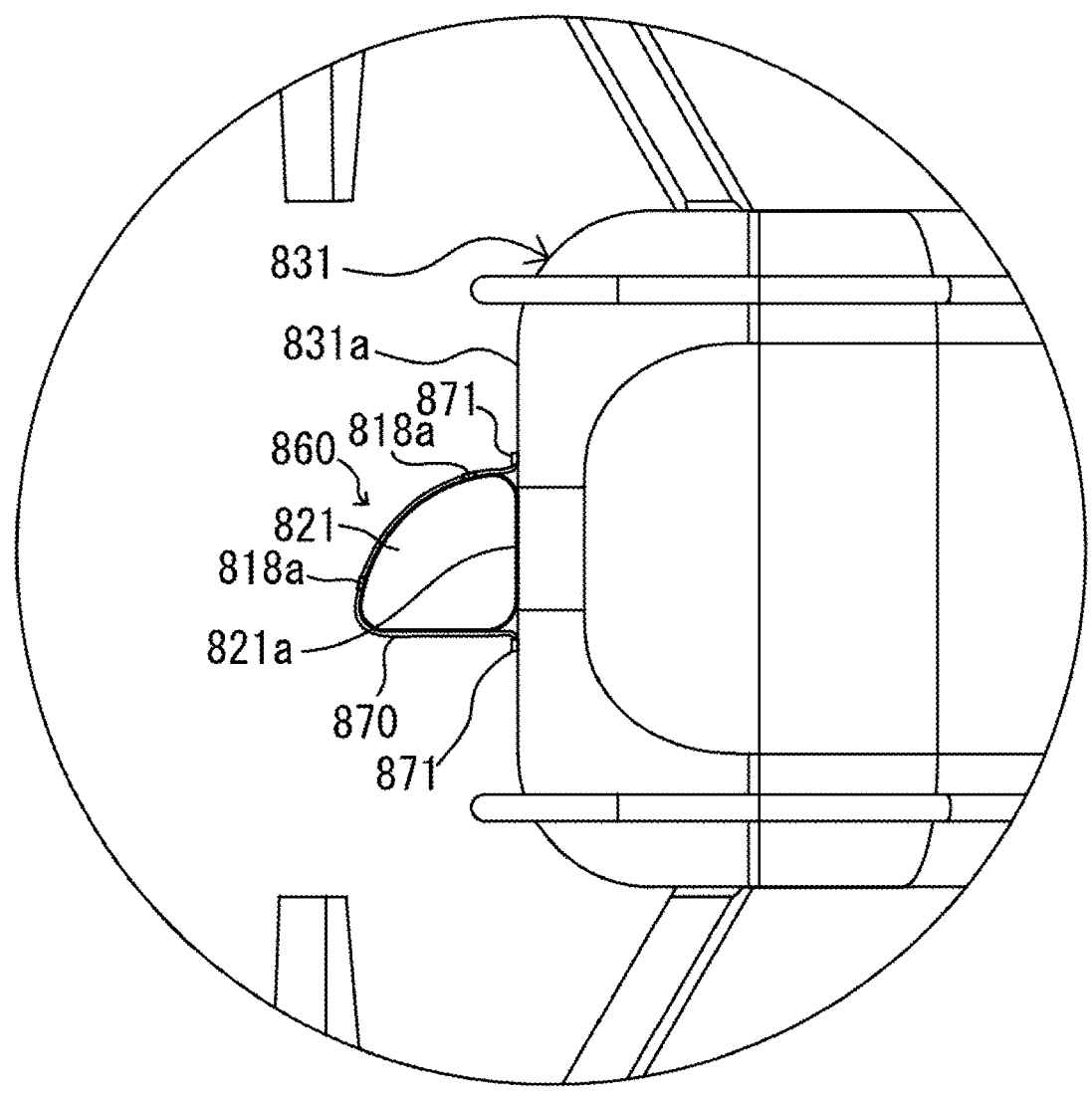
FIG. 30 is an enlarged plan view showing the vicinity of a safety apparatus in an aerial vehicle according to Modification 6.

Furthermore, in the safety apparatus according to each of the above embodiments, the container in the pilot chute ejector is fixed to the airframe of the aerial vehicle via the attachment member, and the pilot chute is ejected, and the main parachute is ejected and deployed with the force of the pilot chute, but this configuration is not restrictive. For example, the safety apparatus may include a main parachute ejector that is increased in size with the same configuration as that of the pilot chute ejector, houses the main parachute instead of the pilot chute, and ejects the main parachute at the time of activation. For example, one modification of the first embodiment is a safety apparatus 860 shown in FIG. 30. In the specific description below, unless otherwise specified, parts similar to (although different in size from) those in the first embodiment are denoted by the same reference signs in the last two digits, and the description thereof is omitted. Unless otherwise specified, the safety apparatus 860 has a similar configuration to that of the pilot chute ejector 362 of Modification 1 except use of the main parachute instead of the pilot chute and the size.

The safety apparatus 860 differs from the safety apparatus 60 according to the first embodiment in that (1) an ejector (not shown) that houses the main parachute (not shown) instead of the pilot chute is provided, (2) the container (not shown) and a lid 821 have such a size as to house the main parachute, (3) an actuator (not shown) that generates a driving force capable of ejecting the main parachute is used, (4) the pilot chute is not provided, (5) an airframe 831 of the aerial vehicle is directly attached without using an attachment member, (6) the container (not shown) and the lid 821 have a shape (here, a flat portion 821*a*) conforming to an external shape 831*a* of the airframe 831 of the aerial vehicle, (7) a belt member 870 having one end and the other end fixed to the external shape 831*a* of the airframe 831 of the aerial vehicle by a belt fixing portion 871 is provided, and (8) a plurality of belt holders 818*a* that can hold (fix) therethrough the belt member 870 to the airframe 831 of the aerial vehicle is provided.

In this modification, as in the first embodiment, since the actuator is provided at a position shifted from the geometric center of the bottom surface of the container (here, a position at a predetermined distance or more than a distance between a portion of the arc of the fan-shaped cross section and the geometric center), the space between the arc of the fan-shaped cross section and the actuator increases. Therefore, the main parachute can be accommodated in an accommodator more easily than in the case where the actuator is installed at the geometric center of the fan-shaped cross section. In addition, since the container and the lid 821 have a shape (here, the flat portion 821*a*) that conforms to the external shape 831*a* of the airframe 831 of the aerial vehicle, the safety apparatus 860 can be easily attached to a portion of the external shape 831*a* of the airframe 831 of the aerial vehicle by using the belt member 870.

<Modification 7>

Figure 31:
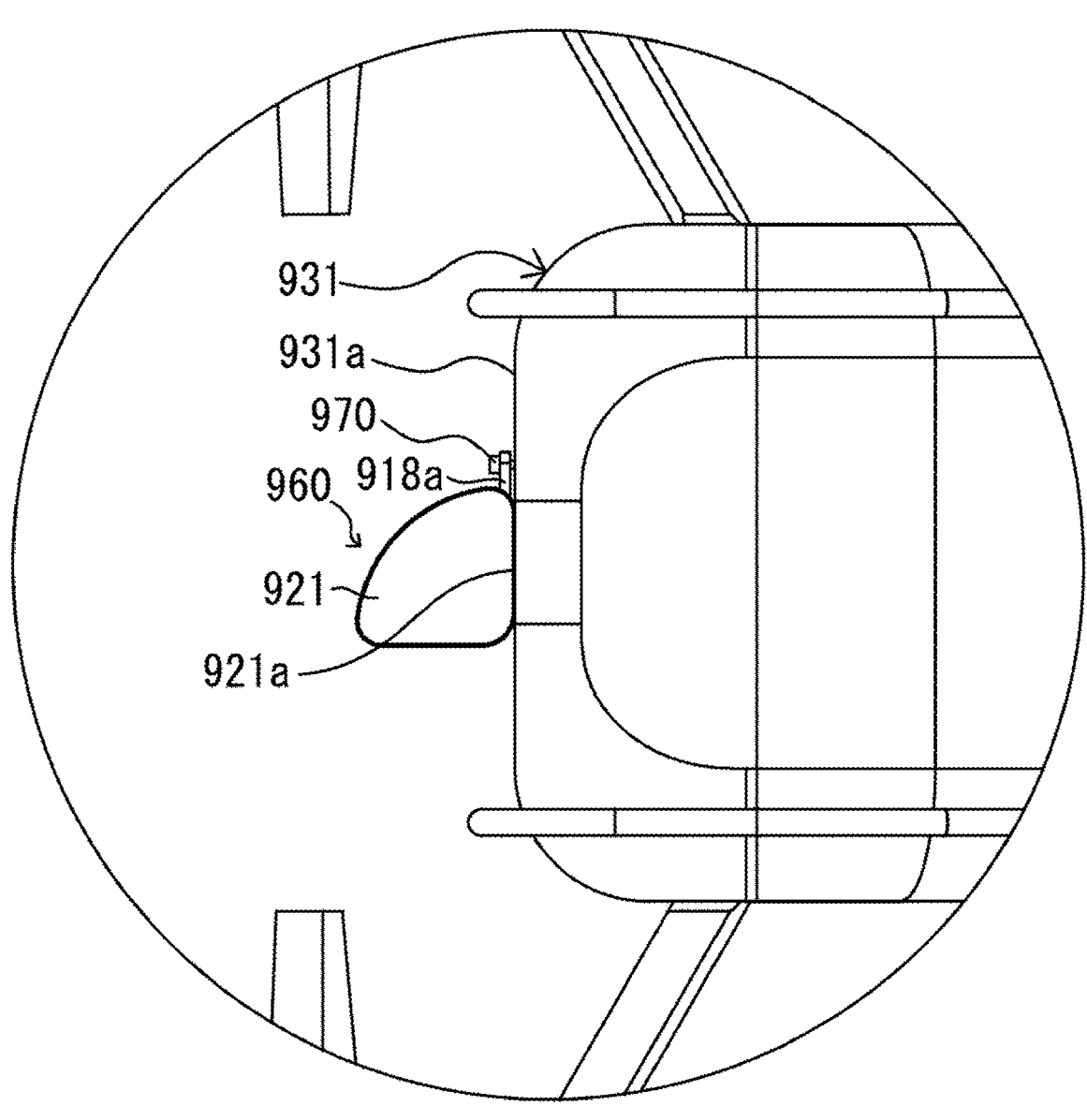
FIG. 31 is an enlarged plan view showing the vicinity of a safety apparatus in an aerial vehicle according to Modification 7.

In addition, examples of the modifications of the first embodiment also include a safety apparatus 960 shown in FIG. 31. In the specific description below, unless otherwise specified, parts similar to (although different in size from) those in the first embodiment are denoted by the same reference signs in the last two digits, and the description thereof is omitted. Unless otherwise specified, the safety apparatus 960 has a similar configuration to that of the pilot chute ejector 462 of Modification 2 except use of the main parachute instead of the pilot chute and the size.

The safety apparatus 960 differs from the safety apparatus 60 according to the first embodiment in that (1) an ejector (not shown) that houses the main parachute (not shown) instead of the pilot chute is provided, (2) the container (not shown) and a lid 921 have such a size as to house the main parachute, (3) an actuator (not shown) that generates a driving force capable of ejecting the main parachute is used, (4) the pilot chute is not provided, (5) an airframe 931 of the aerial vehicle is directly attached without using an attachment member, (6) the container (not shown) and the lid 921 have a shape (here, a flat portion 921*a*) conforming to an external shape 931*a* of the airframe 931 of the aerial vehicle, and (7) a plurality of holders 918*a* that can hold (fix) to the airframe 931 of the aerial vehicle by a bolt 970 is provided in a container (not shown).

In this modification, as in the first embodiment, since the actuator is provided at a position shifted from the geometric center of the bottom surface of the container (here, a position at a predetermined distance or more than a distance between a portion of the arc of the fan-shaped cross section and the geometric center), the space between the arc of the fan-shaped cross section and the actuator increases. Therefore, the main parachute can be accommodated in an accommodator more easily than in the case where the actuator is installed at the geometric center of the fan-shaped cross section. In addition, since the container and the lid 921 have a shape (here, the flat portion 921*a*) that conforms to the external shape 931*a* of the airframe 931 of the aerial vehicle, the safety apparatus 960 can be easily attached to a portion of the external shape 931*a* of the airframe 931 of the aerial vehicle by using the bolt 970.

<Modification 8>

Figure 32:
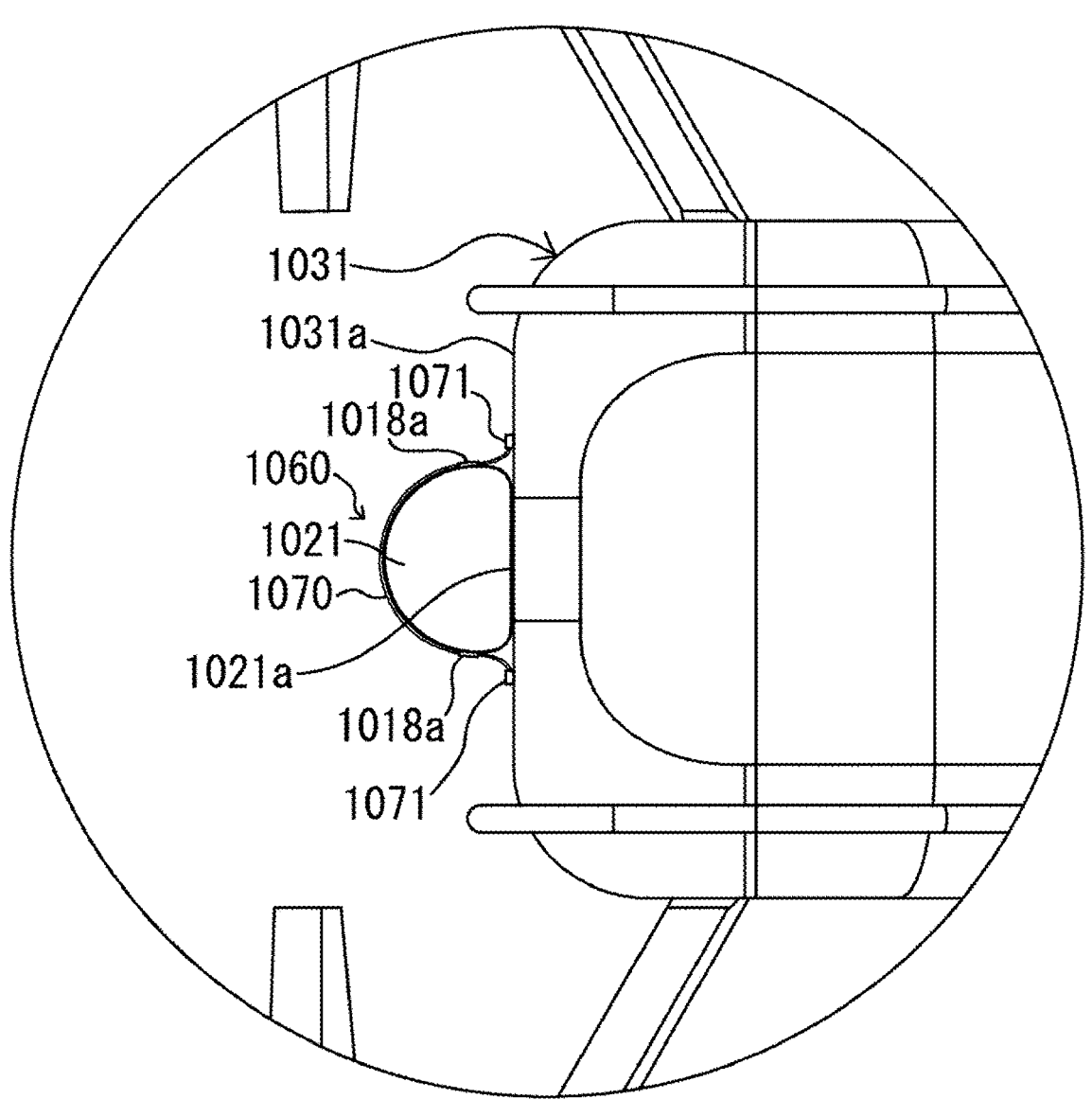
FIG. 32 is an enlarged plan view showing the vicinity of a safety apparatus in an aerial vehicle according to Modification 8.

In addition, examples of the modifications of the second embodiment also include a safety apparatus 1060 shown in FIG. 32. In the specific description below, unless otherwise specified, parts similar to (although different in size from) those in the second embodiment are denoted by the same reference signs in the last two digits, and the description thereof is omitted. Unless otherwise specified, the safety apparatus 1060 has a similar configuration to that of the pilot chute ejector 562 of Modification 3 except use of the main parachute instead of the pilot chute and the size.

The safety apparatus 1060 differs from the safety apparatus 160 according to the second embodiment in that (1) an ejector (not shown) that houses the main parachute (not shown) instead of the pilot chute is provided, (2) the container (not shown) and a lid 1021 have such a size as to house the main parachute, (3) an actuator (not shown) that generates a driving force capable of ejecting the main parachute is used, (4) the pilot chute is not provided, (5) an airframe 1031 of the aerial vehicle is directly attached without using an attachment member, (6) the container (not shown) and the lid 1021 have a shape (here, a flat portion 1021*a*) conforming to an external shape 1031*a* of the airframe 1031 of the aerial vehicle, (7) a belt member 1070 having one end and the other end fixed to the external shape 1031*a* of the airframe 1031 of the aerial vehicle by a belt fixing portion 1071 is provided, and (8) a plurality of belt holders 1018*a* that can hold (fix) therethrough the belt member 1070 to the airframe 1031 of the aerial vehicle is provided.

In this modification, as in the second embodiment, since the actuator is provided at a position shifted from the geometric center of the bottom surface of the container (here, a position at a predetermined distance or more than a distance between a portion of the arc of the cross section having a shape approximate to a circular shape partially having a chord (a circular shape partially cut out) and the geometric center), the space between the arc of the cross section and the actuator increases. Therefore, the main parachute can be accommodated in an accommodator more easily than in the case where the actuator is installed at the geometric center of the cross section. In addition, since the container and the lid 1021 have a shape (here, the flat portion 1021*a*) that conforms to the external shape 1031*a* of the airframe 1031 of the aerial vehicle, the safety apparatus 1060 can be easily attached to a portion of the external shape 1031*a* of the airframe 1031 of the aerial vehicle by using the belt member 1070.

<Modification 9>

Figure 33:
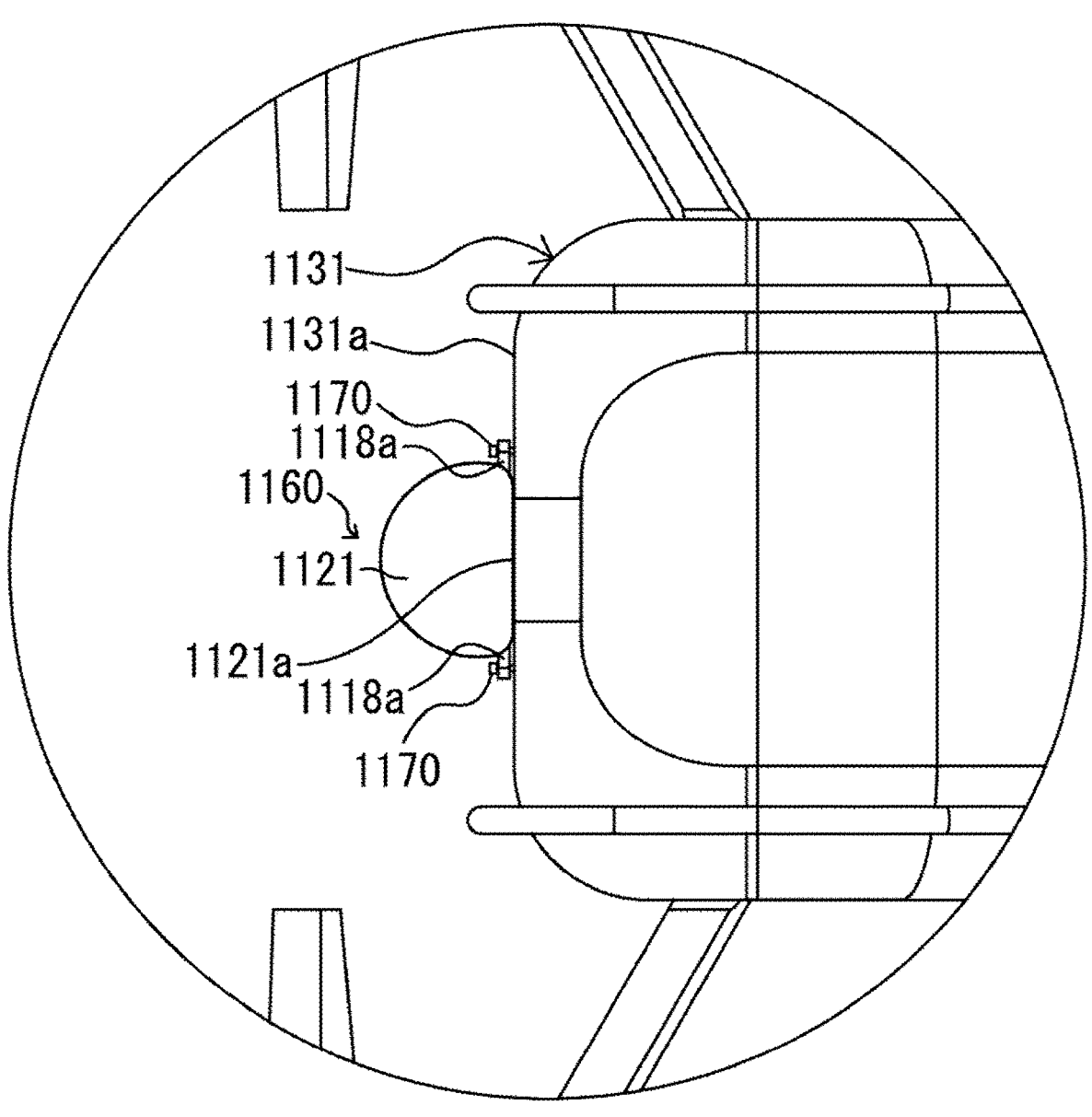
FIG. 33 is an enlarged plan view showing the vicinity of a safety apparatus in an aerial vehicle according to Modification 9.

In addition, examples of the modifications of the second embodiment also include a safety apparatus 1160 shown in FIG. 33. In the specific description below, unless otherwise specified, parts similar to (although different in size from) those in the second embodiment are denoted by the same reference signs in the last two digits, and the description thereof is omitted. Unless otherwise specified, the safety apparatus 1160 has a similar configuration to that of the pilot chute ejector 662 of Modification 4 except use of the main parachute instead of the pilot chute and the size.

The safety apparatus 1160 differs from the safety apparatus 160 according to the second embodiment in that (1) an ejector (not shown) that houses the main parachute (not shown) instead of the pilot chute is provided, (2) the container (not shown) and a lid 921 have such a size as to house the main parachute, (3) an actuator (not shown) that generates a driving force capable of ejecting the main parachute is used, (4) the pilot chute is not provided, (5) an airframe 1131 of the aerial vehicle is directly attached without using an attachment member, (6) the container (not shown) and the lid 1121 have a shape (here, a flat portion 1121*a*) conforming to an external shape 1131*a* of the airframe 1131 of the aerial vehicle, and (7) a plurality of holders 1118*a* that can hold (fix) to the airframe 1131 of the aerial vehicle by a bolt 1170 is provided in a container (not shown).

In this modification, as in the second embodiment, since the actuator is provided at a position shifted from the geometric center of the bottom surface of the container (here, a position at a predetermined distance or more than a distance between a portion of the arc of the cross section having a shape approximate to a circular shape partially having a chord (a circular shape partially cut out) and the geometric center), the space between the arc of the cross section and the actuator increases. Therefore, the main parachute can be accommodated in an accommodator more easily than in the case where the actuator is installed at the geometric center of the cross section. In addition, since the container and the lid 1121 have a shape (here, the flat portion 1121*a*) that conforms to the external shape 1131*a* of the airframe 1131 of the aerial vehicle, the safety apparatus 1160 can be easily attached to a portion of the external shape 1131*a* of the airframe 1131 of the aerial vehicle by using the bolt 1170.

<Modification 10>

An airbag device may be provided in a lower part of the airframe of the aerial vehicle according to each of the above embodiments and modifications. In order to be able to absorb an impact of a fall regardless of the direction, a plurality of airbag devices may also be installed on the side of the airframe so as to cover the entire airframe when the plurality of airbags are deployed. For example, an example of the airbag device is shown in FIG. 34.

Figure 34:
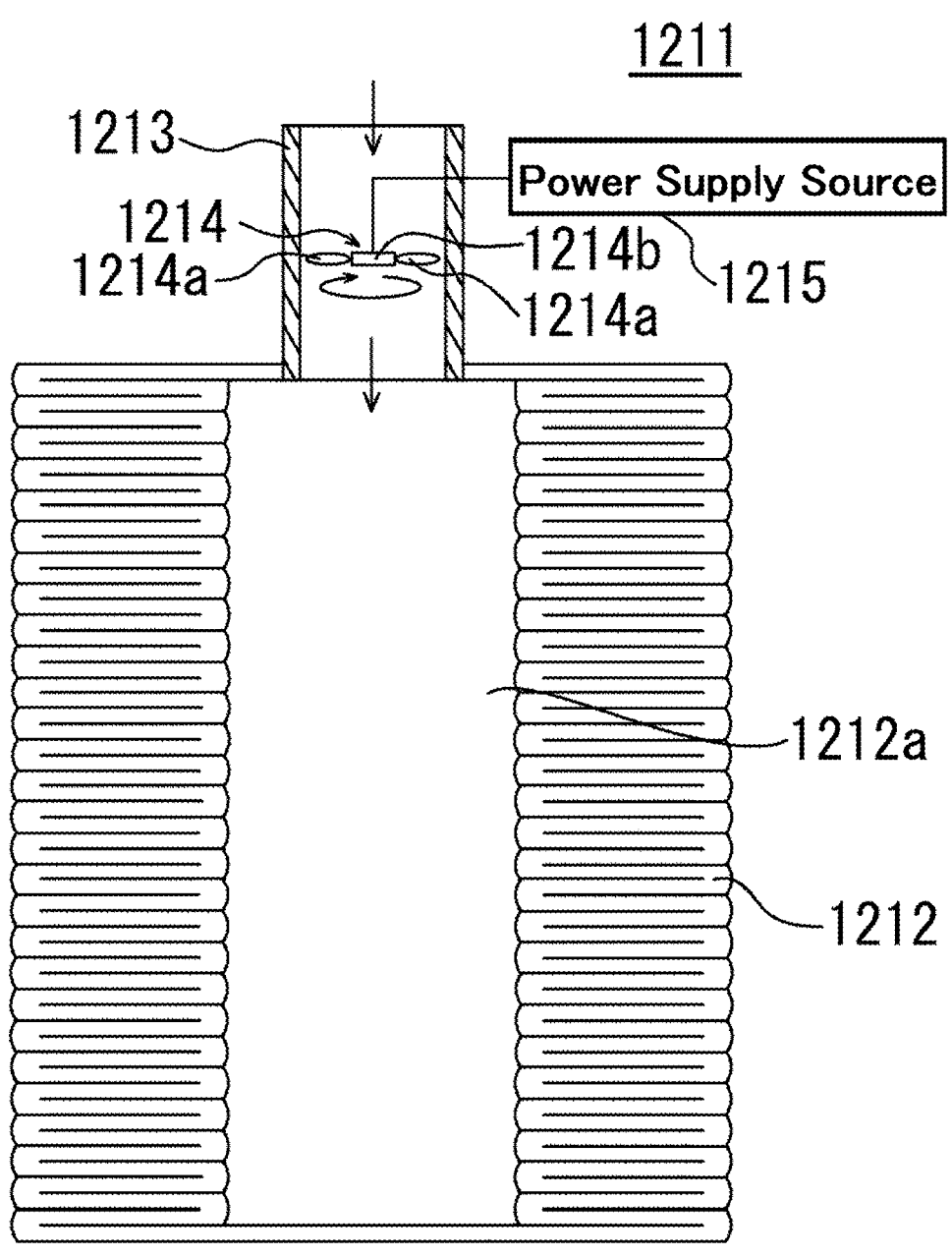
FIG. 34 is a sectional view of an airbag device according to Modification 10.

As shown in FIG. 34, an airbag device 1211 for aircraft according to this modification includes, for example, an airbag 1212 including cloth, a suction pipe 1213 provided in the airbag 1212 so as to communicate with an internal space 1212a of the airbag 1212, and an air supply device 1214 provided corresponding to the suction pipe 1213.

The airbag 1212 is initially configured in a folded state and extends in a vertical direction. The suction pipe 1213 is provided at an upper end of the airbag 1212. The air supply device 1214 includes a fan 1214a that is disposed in the suction pipe 1213 and supplies outside air to the internal space 1212a via the suction pipe 1213, and a rotating member 1214b that rotates around an axis while supporting the fan 1214a. At the time of falling, the rotating member 1214b receives power from a power supply source 1215 and rotates to rotate the fan 1214a so as to introduce the outside air into the internal space 1212a via the suction pipe 1213.

In this modification, a lithium ion battery can be adopted as the power supply source 1215. The power supply source 1215 may be provided in the aerial vehicle or may be provided in the air supply device 1214.

The airbag 1212 is folded in a bellows shape as shown in FIG. 34 before deployment, and inflates in a substantially spherical shape after deployment. The airbag 1212 is provided with an aperture 1212b so that a part of the outside air introduced into the internal space 1212a of the airbag 1212 can flow out to the outside as necessary. As a result, the orientation of the airbag 1212 is stabilized after the airbag 1212 is deployed. Furthermore, by appropriately adjusting the size of the aperture 1212b, it is also possible to implement a function of degassing the internal space 1212a at a time of collision with an object so that the airbag 1212 does not bounce due to an excessively large repulsive force when the airbag 1212 collides with the object. Note that, in FIG. 34, for example, the suction pipe 1213 can be provided so as to be inserted through a central portion of a drone body (not shown) extending in a horizontal direction in FIG. 34.

As described above, according to the airbag device 1211 according to this modification, the air supply device 1214 receives power and rotates the fan 1214a at the time of falling, and thus, the outside air is introduced into the airbag 1212 through the suction pipe 1213. As a result, the airbag 1212 starts to be deployed from a folded state and inflates in a substantially spherical shape.

In this modification, gas is supplied into the airbag 1212 by the fan 1214a, but this configuration is not restrictive. For example, a gas generator may be used. As the gas generator, only an igniter may be used, or a gas generator including an igniter and a gas generating agent may be used. Alternatively, a hybrid or a stored gas generator that cleaves a sealing plate in a small gas cylinder by a gunpowder igniter and discharges internal gas to the outside may be used. In this case, as a pressurized gas in the gas cylinder, a non-flammable gas such as argon, helium, nitrogen, or carbon dioxide, or a mixture thereof can be used. In order to reliably propel a piston when the pressurized gas is released, the gas generator may be provided with a heating element including a gas generating agent composition, a thermite composition, or the like. Alternatively, an airbag device that introduces air into an airbag by using natural intake air may be used.

Other Modifications

As described in the safety apparatus according to each of the above embodiments and modifications, it has been described that each actuator is provided at a position shifted from the geometric center of the shape of the cross section (or the bottom surface) of the container. However, the installation position of the actuator may be any position as long as each actuator can be provided at a position shifted by a predetermined distance or more from a line segment connecting any one of wall surfaces (curved surface, flat surface, or the like) of the accommodator and the geometric center to form a space sufficient for housing the parachute.

As described in each of the above embodiments and modifications, it has been described that each safety apparatus has the flat portion that conforms to the flat portion of a part of the airframe of the aerial vehicle, but this configuration is not restrictive. That is, the outer shape of each safety apparatus may have any shape as long as at least a part of a portion in contact with the airframe of the aerial vehicle conforms to the shape of the contact portion of the airframe.

In the safety apparatus according to each of the embodiments and modifications, the gas generator is adopted as the power source, but the configuration is not limited as long as the sliding member can apply a driving force for propelling along the cylinder to the sliding member. For example, an elastic body such as a spring may be adopted.

In addition, in the safety apparatus according to each of the above embodiments and modifications, a container having a cylindrical shape of a circle or the like having a cross section in a fan shape, a shape approximate to a circular shape partially having a chord (a circular shape partially cut out), or the like is used, but this configuration is not restrictive. For example, the safety apparatus may have another shape having a polygonal cross section, such as a quadrangular cylinder having a square cross section. That is, the container may have a flat surface in a part of the outer shape. In addition, at least a part of the outer shape of the container can be easily attached to the airframe by having a shape conforming to the attachment position of the airframe of the aerial vehicle.

In each of the embodiments and modifications, in a case where a parachute is adopted as the ejected object, the parachute may be packed. As a result, it is possible to provide a cartridge type in which only the parachute can be replaced. Note that the packing is configured to be broken or peeled off at the time of activation.

Furthermore, in each embodiment, the parachute have been described as the ejected object, but this configuration is not restrictive. An ejected object including a lift generation member, a net member for capturing or binding, an extinguishing agent, a life aid, a medicine, or the like may be ejected as the ejected object. Here, examples of the lift generation member include a parafoil, a Rogallo parachute, a single surface parachute, an airplane wing, a propeller, and a balloon. When the lift generation member has a control line, the safety apparatus desirably includes a steering mechanism capable of changing an inclination angle of the ejected lift generation member using the control line. This steering mechanism includes a plurality of reels for winding up a plurality of control lines coupled to the lift generation member and includes a motor serving as power of the reels, for example. By winding up or pulling out the control lines by driving the motor, it is possible to appropriately pull the lift generation member or loosen a tension.

The actuator in the safety apparatus according to each of the above embodiments and modifications may be the following actuator. In the specific description below, unless otherwise specified, parts similar to those in the first embodiment are denoted by the same reference signs in the last two digits, and the description thereof is omitted.

Figure 35:
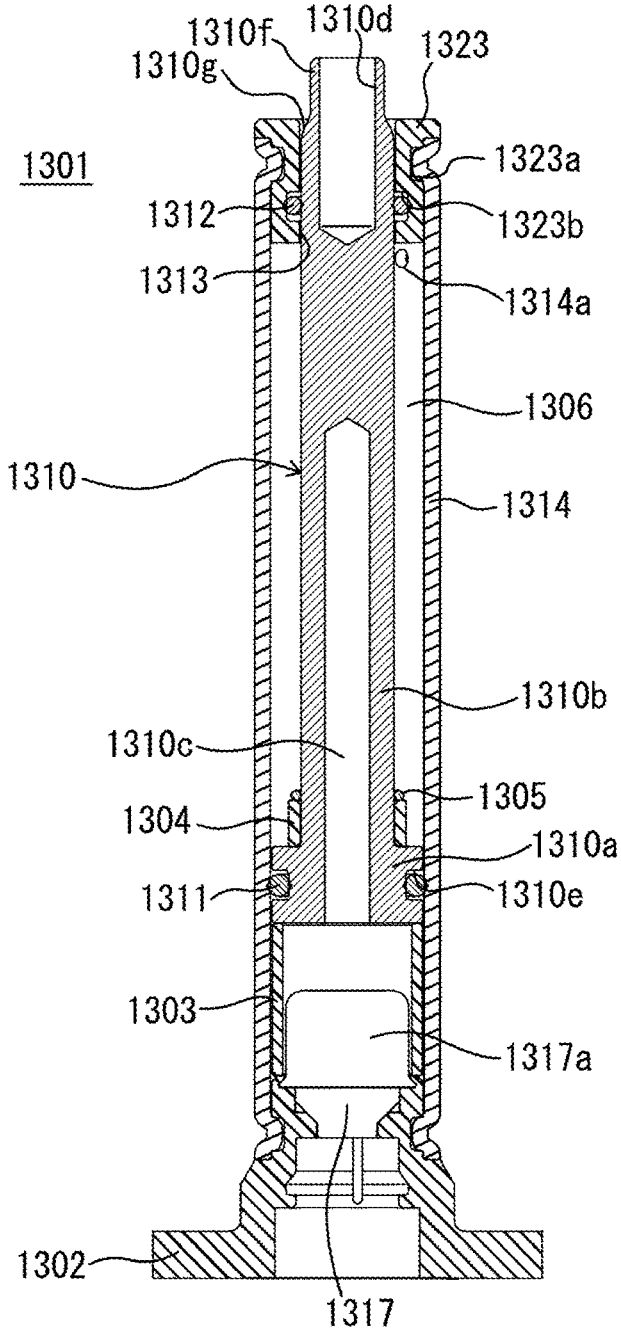
FIG. 35 is a sectional view showing a modification of an actuator.
Figure 36:
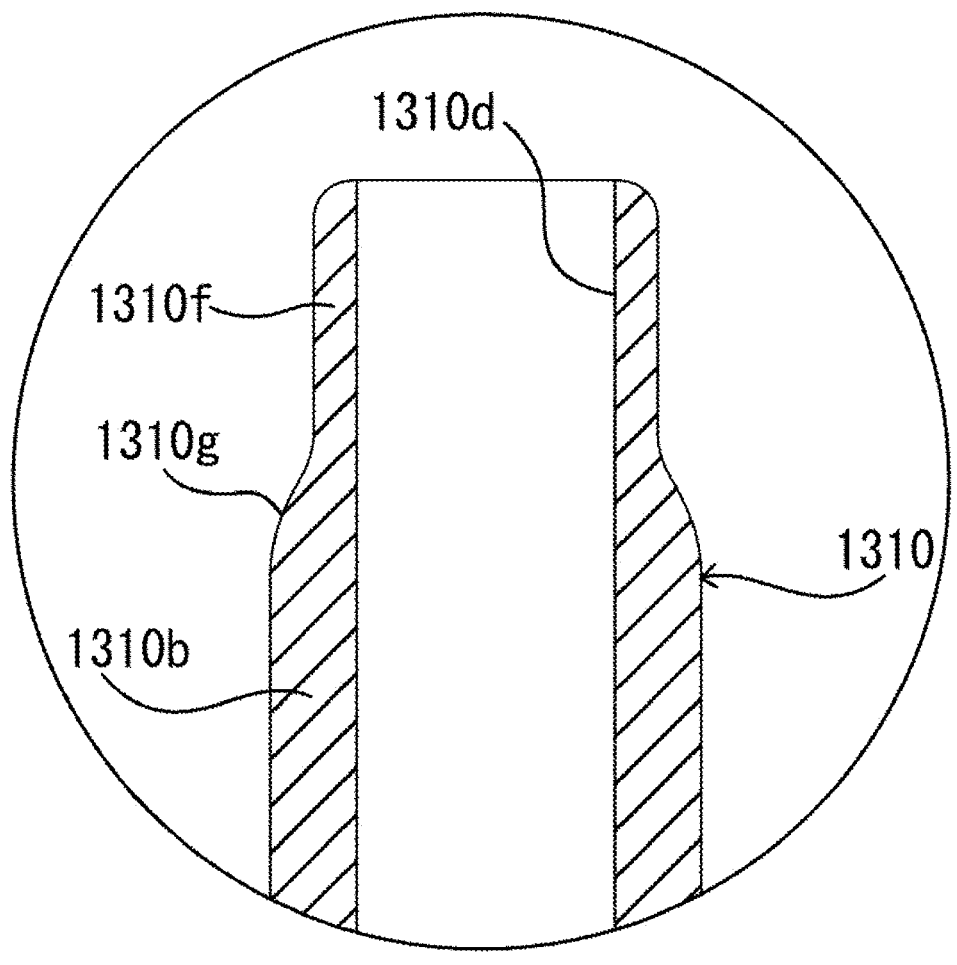
FIG. 36 is a partially enlarged view of a distal end of a piston member in the actuator in FIG. 35.

As shown in FIGS. 35 and 36, for example, the piston member 1310 may include a body 1310*a* having a portion having an outer diameter substantially equal to an inner diameter of a cylinder 1314, a rod 1310*b* connected to the body 1310*a*, extending upward, and having a smaller diameter than a diameter of the body 1310*a*, a hole 1310*c* provided inside the body 1310*a* and the rod 1310*b*, an internal thread 1310*d* provided at an upper end of the rod 1310*b*, a groove 1310*e* provided in a peripheral direction of the body 1310*a* and a reduced diameter portion 1310*f* having a smaller diameter than the diameter of the rod 1310*b*, and a tapered portion 1310*g* formed between the rod 1310*b* and the reduced diameter portion 1310*f*.

Here, as shown in FIG. 36, the tapered portion 1310*g* is formed to have a smooth shape (for example, a rounded shape without corners, and the like) between the rod 1310*b* and the reduced diameter portion 1310*f*. This configuration can suppress catching on a sealing member 1312 such as an O-ring and prevent the sealing member 1312 from being damaged to deteriorate performance. This also leads to suppression of injury during assembly of the apparatus.

Figure 37:
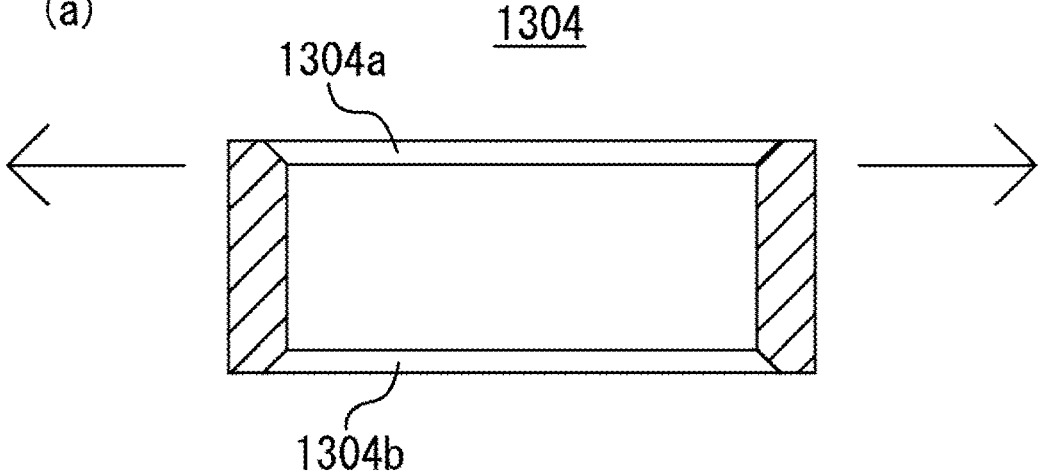
FIG. 37(*a*) is a sectional view of a tubular member in the actuator in FIG. 35 before activation, and FIG. 37(*b*) is a sectional view of the tubular member in the actuator in FIG. 35 after activation.
Figure 37:
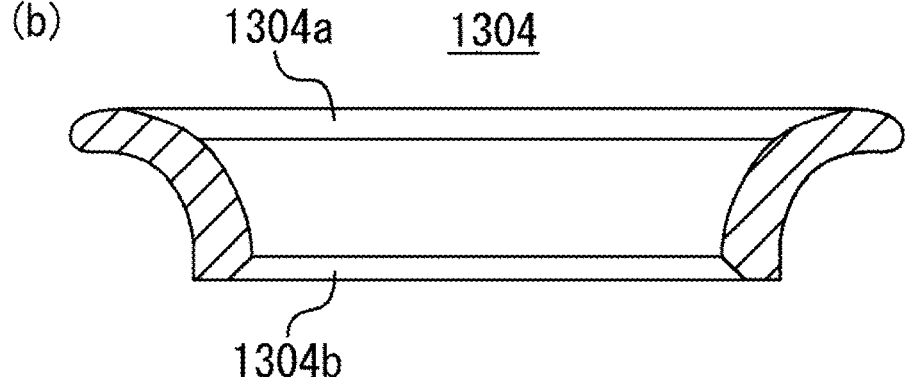

As shown in FIG. 37(*a*), tapered portions 1304*a* and 1304*b* are formed inside both openings of the tubular member 1304. As a result, when a gas generator 1317 is activated at the time of a fall of an aerial vehicle or the like, for example, equipped with the safety apparatus including the actuator 1301, the following operational effects can be obtained. That is, the piston member 1310 propels the inside of the cylinder 1314 upward by the pressure of the gas generated by the activation. As a result, a push-up member (similar to the push-up member according to any of the above embodiments or modifications) having a bottomed cylindrical portion 1319 connected to the rod 1310*b* of the piston member 1310 is propelled (protrudes) upward in a container (similar to the container according to any of the above embodiments or modifications). As a result, a lid (similar to the lid according to any of the above embodiments or modifications) is detached, an opening end of the container is opened, and an ejected object (similar to the ejected object according to any of the above embodiments or modifications) is ejected outward from the container. At this time, the piston member 1310 and the tubular member 1304 move upward. Meanwhile, the tubular member 1304 collides with a stopper member 1323, and the tubular member 1304 is expanded in diameter so as to open from an upper opening from an initial state shown in FIG. 37(*a*) due to substantially uniform compression, and is plastically deformed into the shape shown in FIG. 37(*b*). As a result, the influence of the operation of the piston member 1310 on the entire safety apparatus is alleviated. In particular, the influence on the push-up member connected to the piston member 1310 is alleviated. In a case where the ejected object is a parachute or a paraglider, the ejected object is ejected from the container and then deployed.

As described above, the present embodiment can provide a safety apparatus including the actuator 1301 that can be reduced in weight as compared with a related art while alleviating the impact at the time of activation. In particular, since the impact on the push-up member in the actuator 1301 can be alleviated, a necessary strength can be maintained even if a thickness of a member of the push-up member is reduced to some extent (the push-up member includes resin and has a thickness of 2 mm, for example) to reduce the weight. Therefore, since it is not necessary to use a material having relatively high strength for the push-up member and the like, there is also an advantage in terms of cost.

The tapered portions 1304*a* and 1304*b* are formed inside both the openings of the tubular member 1304. In addition, in order to prevent the tubular member 1304 from contacting an inner wall of the cylinder 1314, the tubular member 1304 plastically deformed when colliding with the stopper member 1323 is separated by a distance so as not to contact the inner wall of the cylinder 1314. As a result, even if the tubular member 1304 collides with the stopper member 1323 and is plastically deformed, the tubular member 1304 is deformed without being hindered by the inner wall of the cylinder 1314, and can sufficiently alleviate the impact of the piston member 1310.

Figure 38:
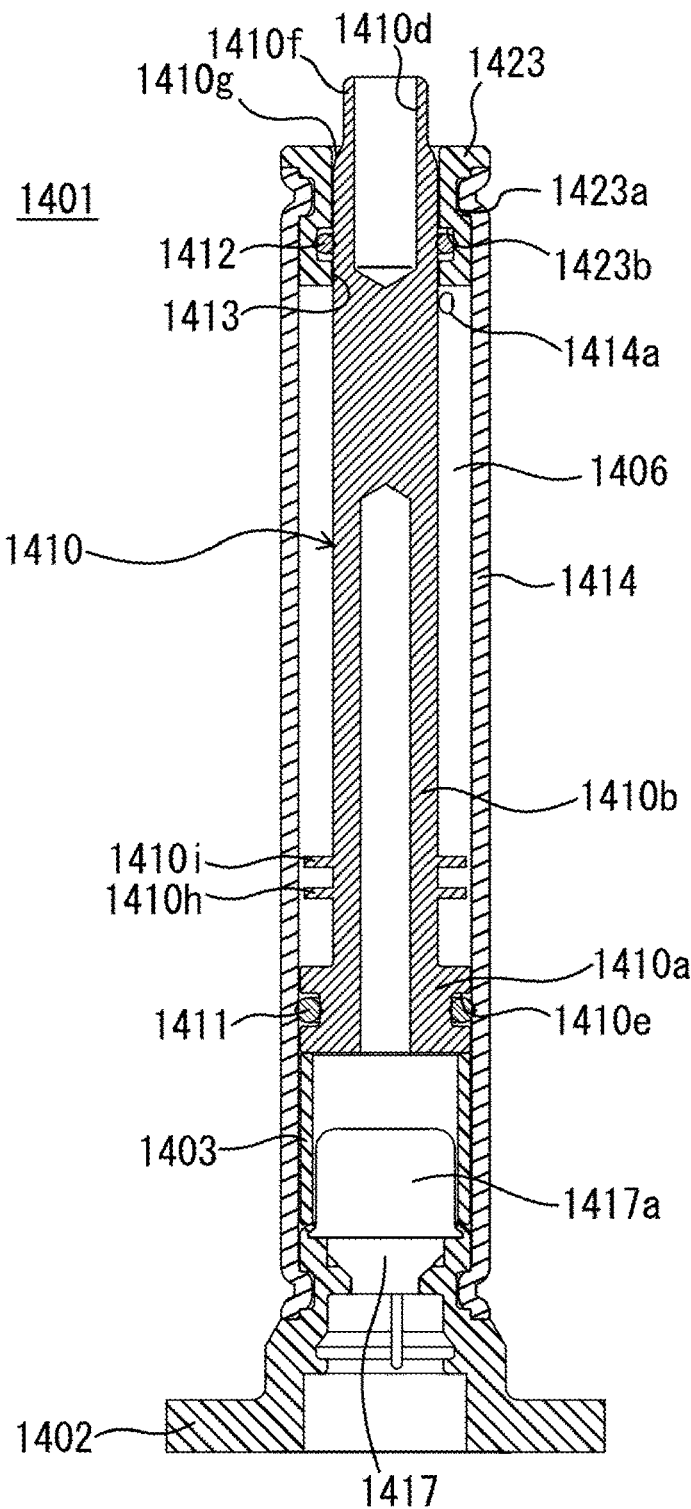
FIG. 38 is a diagram showing a modification of the actuator in FIG. 35.

Instead of the actuator 1301, an actuator 1401 according to a modification shown in FIG. 38 may be used. Hereinafter, the actuator 1401 according to this modification will be specifically described. Unless otherwise specified, parts similar to those in the embodiment are denoted by the same reference signs in the last two digits, and the description thereof may be omitted. In this modification, the same components as those in the embodiment are used unless otherwise specified.

The actuator 1401 according to this modification is different from the actuator 1301 in that a piston member 1410 is used instead of the piston member 1310. Specifically, the actuator 1401 is different from the actuator 1301 in that at least one flange-shaped portion (in FIG. 38, two protrusions 1410*h* and 1410*i*) fixed around a part of a rod 1410*b* is fixedly provided without using the tubular member 1304 and the holding member 1305.

The protrusions 1410*h* and 1410*i* are fixed to fixed to the rod 1410*b* with a strength that causes shear fracture of a portion (a connection portion between the protrusions 1410*h* and 1410*i* and the rod 1410*b*) fixed to the rod 1410*b* when the protrusions 1410*h* and 1410*i* collide with a stopper member 1423 at the time of activation. The shape of the protrusions 1410*h* and 1410*i* may be a flange shape or a shape in which a plurality of rod shapes protrude in a radial direction. Examples of a fixing method at this time include integral molding by chipping (cutting), attachment by welding, and the like.

The actuator 1401 having the above configuration can alleviate the impact of the collision between the protrusions 1410*h* and 1410*i* (the piston member 1410) and the stopper member 1423 when the portion fixed to the rod 1410*b* of the protrusions 1410*h* and 1410*i* is shear-fractured. Therefore, similar effect to the effect of the actuator 1301 can be obtained.

Example 1

Figure 39:
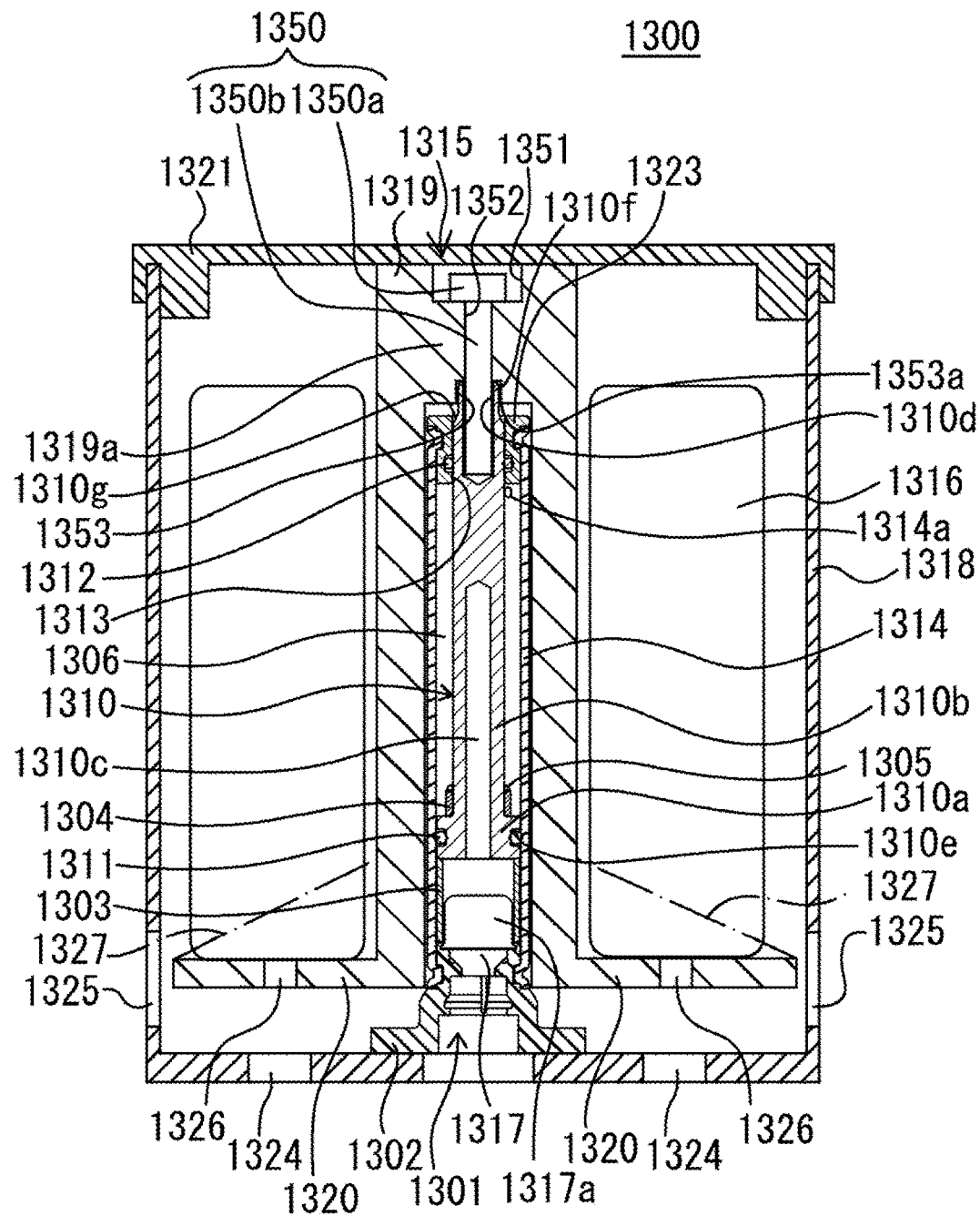
FIG. 39 is a sectional view of a safety apparatus according to a simulation of an example including the actuator in FIG. 35.

As shown in FIG. 39 (unless otherwise specified, parts similar to those in the embodiment are denoted by the same reference signs in the last two digits, and the description thereof will be omitted), a push-up member supposed to include resin (here, glass fiber-reinforced PA (polyamide) 66 (PA 66+GF 33%) containing 33% of glass fiber (GF) and having a Young's modulus of 10 GPa) of a safety apparatus 1300 (in which a container 1318 has a cylindrical shape, and the support 20 of a push-up member 1315 has a disk shape) provided with the actuator 1301 was designed, and a simulation experiment was conducted to study how a deflection of the support (flange) of the push-up member changes depending on the thickness of the push-up member. The experimental method is shown below.

The deflection of the support (flange) of the push-up member was measured by using simulation software (named Auto desk Nastran In-CAD) by calculating a force with which a piston breaks from a sectional formula of the piston (calculating a breaking load from a tensile strength and a sectional area). As measurement conditions, a top surface of the push-up member was fixed, a load was applied from a bottom surface of the support, variation of each part of the push-up member was confirmed, and a maximum displacement from the original position of the bottom surface of the support was regarded as deflection, and measurement was performed in the presence and absence of the tubular member (of material A6063-0, inner diameter 10.1 mm, and outer diameter 12.1 mm). In the push-up member, an outer diameter of the bottomed cylindrical portion is 31 mm, and an outer diameter of the support is 105 mm. Furthermore, the displacement of the support from the original position of the bottom surface was analyzed by a finite element method.

The result of the above experiment is shown below. When the tubular member is provided, even if the thickness of the push-up member is reduced from 3 mm to 2 mm, bending fracture does not occur in the support of the push-up member as in a case where the thickness of the push-up member is 3 mm in the absence of the tubular member.

TABLE 1

| Tubular member | Thickness of push-up plate | | | |
| | 2 mm | | 3 mm | |
| | Present | Absent | Present | Absent |
| --- | --- | --- | --- | --- |
| Weight of push-up member + weight of tubular member [g] | 82.63 | 82.04 | 105.84 | 105.25 |
| Deflection of support of push-up member [mm] | 2.932 | 4.013 | 1.949 | 2.668 |

As described above, it has been found that by providing the tubular member, the impact of the piston member at the time of activation can be alleviated, and even if the thickness of the resin-made pushing member is reduced from 3 mm to 2 mm to reduce the weight, bending fracture does not occur in the push-up member, and the necessary strength is maintained.

Example 2

An aluminum push-up member, a piston member, a base (a squib holder), and a cylinder of a safety apparatus having the same configuration as the safety apparatus in FIG. 39 was created, and by changing a material of a cushioning material (a flange-shaped protrusion (corresponding to a modification in FIG. 38) or a tubular member (corresponding to a modification in FIGS. 35 to 37)), whether the impact at the time of activation of the actuator can be alleviated was tested. In each experiment, a gas generator, a gas generating agent used in the gas generator and its amount, the push-up member, and the like were all unified. The specifications of each member used in the experiment (three samples were prepared for one specification) are shown in the following Table 2. In Table 2 below, "HT" of temperature refers to a test in a high temperature environment of 85° C., "stroke" refers to a movement distance of the piston member in the cylinder (a distance from an initial state to collision with a stopper), and "resin" as a material of the cushioning material refers to monomer cast nylon. Specifications A and B are cushioning materials including two flange-shaped protrusions (corresponding to a modification in FIG. 38), and the specifications C to L are cushioning materials including tubular members (corresponding to a modification in FIGS. 35 to 37). The thickness of the cushioning material of the specification A is 1 mm, and the thickness of the cushioning material of the specification B is 0.5 mm. The size in a radial direction of the cushioning material of specifications C, E, and G is 10.1 mm in inner diameter and 12.1 mm in outer diameter, the size in the radial direction of the cushioning material of specifications D, F, and H is 10.1 mm in inner diameter and 14.1 mm in outer diameter, the size in the radial direction of the cushioning material of specifications I and J is 10 mm in inner diameter and 16 mm in outer diameter, the size in the radial direction of the cushioning material of a specification K is 10 mm in inner diameter and 15 mm in outer diameter, and the size in the radial direction of the cushioning material of a specification L is 10 mm in inner diameter and 15 mm in outer diameter. Here, two cushioning materials of the specification K were fitted in an axial direction of the piston member (overlapped in two stages) and tested. In addition, two cushioning materials of the specification L were fitted in an axial direction of the piston member (overlapped in four stages) and tested.

TABLE 2

| Specification | No. | Temperature | Stroke [mm] | Squib holder Material | Piston Material | Cushioning material Material | Hardness of cushioning material | Weight of push-up plate [g] |
| --- | --- | --- | --- | --- | --- | --- | --- | --- |
| A | 1-3 | HT | 64.5 | A2024-T4 | A2024-T4 | A2024-T4 | 120 HV | 130 |
| B | 4-6 | HT | 64.5 | A2024-T4 | A2024-T4 | A2024-T4 | 120 HV | 130 |
| C | 7-9 | HT | 64.5 | A2024-T4 | A2024-T4 | A5056-O | 63 HV | 130 |
| D | 10-12 | HT | 64.5 | A2024-T4 | A2024-T4 | A5056-O | 63 HV | 130 |
| E | 13-15 | HT | 64.5 | A2024-T4 | A2024-T4 | A6063-O | 25 HV | 130 |
| F | 16-18 | HT | 64.5 | A2024-T4 | A2024-T4 | A6063-O | 25 HV | 130 |
| G | 19-21 | HT | 64.5 | A2024-T4 | A2024-T4 | Resin | — | 130 |
| H | 22-24 | HT | 64.5 | A2024-T4 | A2024-T4 | Resin | — | 130 |
| I | 25-27 | HT | 64.5 | A2024-T4 | A2024-T4 | Silicone rubber | Shore A50 | 130 |
| J | 28-30 | HT | 64.5 | A2024-T4 | A2024-T4 | Low-elasticity rubber | Shore A32 | 130 |
| K | 31-33 | HT | 64.5 | A2024-T4 | A2024-T4 | Sponge | Asker C35 | 130 |
| L | 34-36 | HT | 64.5 | A2024-T4 | A2024-T4 | Sponge | Asker C35 | 130 |

The experimental results for each sample of each specification are shown in the following Table 3. In Table 3, "total height" indicates an axial length of the piston member, "deformation amount" indicates a deformation amount of the axial length of the piston member, and "elongation"

indicates an elongation percentage of the axial length of the piston member after activation from the initial state. In the first sample of each specification, in a case where the piston member or the base (squib holder) was broken, the experiments on the other two samples were not performed.

TABLE 3

| | | | | | Result of activation confirmation test | | | | | |
| | | Cushioning material | | Weight | Presence or absence of | Broken | Full height | Deflection amount | Elongation | |
| Specification | No. | Material | Hardness | [g] | breakage | component | [mm] | [mm] | [%] | Determination |
|---|---|---|---|---|---|---|---|---|---|---|
| A | 1 | A2024-T4 | 120 HV | 132.8 | Normal activation | None | 87.90 | 0.90 | 1.02 | OK |
| | 2 | A2024-T4 | 120 HV | 132.6 | Normal activation | None | 88.03 | 1.30 | 1.17 | |
| | 3 | A2024-T4 | 120 HV | 132.6 | Normal activation | None | 87.90 | 0.90 | 1.02 | |
| B | 4 | A2024-T4 | 120 HV | 132.6 | Breakage | Piston | — | — | — | NG |
| | 5 | A2024-T4 | 120 HV | | Not tested | | | | | |
| | 6 | A2024-T4 | 120 HV | | Not tested | | | | | |
| C | 7 | A5056-O | 63 HV | 133.1 | Normal activation | None | 87.13 | 0.13 | 0.15 | OK |
| | 8 | A5056-O | 63 HV | 133.0 | Normal activation | None | 87.15 | 0.15 | 0.17 | |
| | 9 | A5056-O | 63 HV | 133.2 | Normal activation | None | 87.14 | 0.14 | 0.16 | |
| D | 10 | A5056-O | 63 HV | 134.1 | Breakage | Squib holder | 88.14 | 1.14 | 1.29 | NG |
| | 11 | A5056-O | 63 HV | | Not tested | | | | | |
| | 12 | A5056-O | 63 HV | | Not tested | | | | | |
| E | 13 | A6063-O | 25 HV | 133.0 | Normal activation | None | 87.15 | 0.15 | 0.17 | OK |
| | 14 | A6063-O | 25 HV | 133.3 | Normal activation | None | 87.10 | 0.10 | 0.11 | |
| | 15 | A6063-O | 25 HV | 133.2 | Normal activation | None | 87.12 | 0.12 | 0.14 | |
| F | 16 | A6063-O | 25 HV | 134.3 | Breakage | Squib holder | 88.14 | 1.14 | 1.29 | NG |
| | 17 | A6063-O | 25 HV | | Not tested | | | | | |
| | 18 | A6063-O | 25 HV | | Not tested | | | | | |
| G | 19 | Nylon | 7.1 HV | 132.7 | Normal activation | None | 87.90 | 0.90 | 1.02 | OK |
| | 20 | Nylon | 7.1 HV | 132.7 | Normal activation | None | 87.90 | 0.90 | 1.02 | |
| | 21 | Nylon | 7.1 HV | 132.6 | Normal activation | None | 87.83 | 0.83 | 0.95 | |
| H | 22 | Nylon | 7.1 HV | 133.0 | Normal activation | None | 87.32 | 0.32 | 0.37 | OK |
| | 23 | Nylon | 7.1 HV | 133.0 | Normal activation | None | 87.27 | 0.27 | 0.31 | |
| | 24 | Nylon | 7.1 HV | 132.9 | Normal activation | None | 87.31 | 0.31 | 0.36 | |
| I | 25 | Silicone rubber | Shore A50 | 133.6 | Breakage | Piston | — | — | — | NG |
| | 26 | Silicone rubber | Shore A50 | | Not tested | | | | | |
| | 27 | Silicone rubber | Shore A50 | | Not tested | | | | | |
| J | 28 | Low-elasticity rubber | Shore A32 | 134.0 | Normal activation | None | 88.14 | 1.14 | 1.29 | NG |
| | 29 | Low-elasticity rubber | Shore A32 | 133.7 | Normal activation | None | 88.09 | 1.09 | 1.24 | |
| | 30 | Low-elasticity rubber | Shore A32 | 133.7 | Breakage | Piston | — | — | — | |
| K | 31 | Sponge rubber | Asker C35 | 132.7 | Normal activation | None | 87.82 | 0.82 | 0.93 | NG |
| | 32 | Sponge rubber | Asker C35 | 132.8 | Breakage | Piston | — | — | — | |
| | 33 | Sponge rubber | Asker C35 | 132.8 | Normal activation | None | 87.81 | 0.81 | 0.92 | |
| L | 34 | Sponge rubber | Asker C35 | 133.4 | Normal activation | None | 88.38 | 1.38 | 1.56 | NG |
| | 35 | Sponge rubber | Asker C35 | 133.2 | Breakage | Piston | — | — | — | |

TABLE 3-continued

| | | Cushioning material | | Weight | Result of activation confirmation test | | | | | | |
| | | | | | Presence or absence of | Broken | Full height | Deflection amount | Elongation | | |
| Specification | No. | Material | Hardness | [g] | breakage | component | [mm] | [mm] | [%] | Determination |
|---|---|---|---|---|---|---|---|---|---|---|
| | 36 | Sponge rubber | Asker C35 | 133.3 | Breakage | Piston | — | — | — | |

Table 3 shows that the specification A absorbs an impact force at the time of activation by being shear-fractured, and a normal activation occurs (breakage of the piston member or the base (squib holder) does not occur). On the other hand, it has been found that the specification B having a thickness half of the thickness of the specification A is shear-fractured but cannot sufficiently absorb the impact force, and the piston member might be broken. In addition, it has been found that the specifications C, E, G, and H absorb the impact force at the time of activation by being plastically deformed, and the normal activation occurs (breakage of the piston member or the base (squib holder) does not occur). On the other hand, it has been found that the specifications D, F, I, J, K, and L cannot sufficiently absorb the impact force, and the base (squib holder) or the piston member might be broken.

From the above results, it has been found that the piston member or the base (squib holder) can be prevented from being broken by using a cushioning material (a flange-shaped protrusion (corresponding to the modification in FIG. 38) or a tubular member (corresponding to the modification in FIGS. 35 to 37)) designed to appropriately absorb the impact force at the time of activation by shear fracture or plastic deformation.

REFERENCE SIGNS LIST 1, 101, 201, 701, 1301, 1401 Actuator
2, 102, 202, 302, 402, 502, 602, 1302, 1402 Base
3, 103, 203, 1303, 1403 Cylindrical member
4, 104, 204, 1304, 1404 Tubular member
5, 105, 205, 1305 Holding member
6, 106, 206, 1306, 1406 Space
10, 110, 210, 710, 1310, 1410 Piston member
10a, 110a, 210a, 1310a, 1410a Body
10b, 110b, 210b, 1310b, 1410b Rod
10c, 110c, 210c, 1310c, 1410c Hole
10d, 110d, 210d, 1310d, 1410d Internal thread
11, 12, 111, 112, 1311, 1312, 1411, 1412 Sealing member
13, 113, 213, 1313, 1413 Bore
14, 114, 214, 1314, 1414 Cylinder
14a, 114a, 214a, 1314a, 1414a Through hole
15, 115, 215, 1315, 1415 Push-up member
16, 116, 216 Pilot chute
17, 117, 217, 1317, 1417 Gas generator
17a, 117a, 217a, 1317a, 1417a Cup
18, 118, 218, 318, 418, 518, 618, 718, 1318 Container
19, 119, 219, 719, 1319, 1419 Bottomed cylindrical portion
19a, 119a, 219a, 1319a, 1419a Bottom
20, 120, 220, 720, 1320 Support
21, 121, 221, 321, 421, 521, 621, 721, 821, 921, 1021, 1121, 1321 Lid
23, 123, 223, 1323, 1423 Stopper member 10e, 23a, 23b, 123a, 123b, 223a, 223b, 1310e, 1323a, 1323b, 1423a, 1423b Groove
25, 126, 224, 225, 226, 1324, 1325, 1326 Vent hole
30 Aerial vehicle
31, 131, 231, 831, 931, 1031, 1131 Airframe
32 Propulsion mechanism
33 Leg
50, 150, 250, 1350, 1450 Bolt member
50a, 150a, 250a, 1350a, 1450a Head
50b, 150b, 250b, 1350b, 1450b External thread
51, 52, 53, 151, 152, 153, 252, 253, 1352, 1353, 1452, 1453 Hole
53a, 153a, 253a, 1353a, 1453a Insertion opening
60, 160, 260, 860, 960, 1060, 1160, 1300 Safety apparatus
61, 161, 261 Attachment member
62, 162, 262, 362, 462, 562, 662, 762 Pilot chute ejector
63, 163, 263 Main parachute storage
127, 1327 Movement preventing member
318a, 818a, 1018a Belt holder
418a, 918a, 1118a Holder
784 Igniter
870, 1070 Belt member
871, 1071 Belt fixing portion
970, 1170 Bolt
831a, 931a, 1031a, 1131a Flat portion
1211 Airbag device
1212 Airbag
1212a Internal space
1212b Aperture
1213 Suction pipe
1214 Air supply device
1214a Fan
1214b Rotating member
1215 Power supply source
1304a, 1304b, 1310g, 1410g Tapered portion
1310f, 1410f Reduced diameter portion
1316 Parachute or paraglider

The invention claimed is:
1. An actuator comprising:
a piston member including a body and a rod extending between a first end and a second end, said first end of the rod is directly connected to the body and having a smaller diameter than a diameter of the body;
a tubular member loosely fitted around the first end of the rod in a state where one end of the tubular member is in contact with the body;
a cylinder having an inner wall extending along a longitudinal axis of said cylinder between a proximal end and a distal end of said cylinder, such that said cylinder slidably accommodates the piston member and the tubular member inside the cylinder;
a stopper member provided at said distal end of the cylinder and having a bore through which the piston member protrudes outward from inside of the cylinder at a time of activation, the stopper member limiting movement of the tubular member within the cylinder at the time of activation; and a power source that is provided at said proximal end of the cylinder and generates power for sliding the piston member in the cylinder, wherein the tubular member includes a material that plastically deforms and has a lower tensile strength than a tensile strength of the piston member and the stopper member, such that during activation of said power source, the tubular member collides with the stopper member and the tubular member is plastically deformed; and wherein the tubular member and said inner wall of the cylinder are separated from each other by a predetermined distance or more so that the tubular member does not contact the inner wall of the cylinder when said piston member slides inside the cylinder and after the tubular member collides with the stopper member such that the tubular member is plastically deformed by substantially uniform compression.

2. An actuator comprising:

a sliding member including a body and a rod extending between a first end and a second end, said first end of the rod is directly connected to the body and having a smaller width than a width of the body;

a tubular member provided around the first end of the rod in a state where one end of the tubular member is in contact with the body;

a cylinder having an inner wall extending along a longitudinal axis of said cylinder between a proximal end and a distal end of said cylinder, such that said cylinder slidably accommodates the sliding member and the tubular member in an inside of the cylinder;

a stopper member provided at said distal end of the cylinder and having a bore through which the sliding member protrudes outward from the inside at a time of activation, the stopper member limiting movement of the tubular member within the cylinder at the time of activation; and a power source that is provided at said proximal end of the cylinder and generates power for sliding the sliding member, wherein the tubular member includes a material that plastically deforms and has a lower tensile strength than a tensile strength of the sliding member and the stopper member, such that during activation of said power source, the tubular member collides with the stopper member and the tubular member is plastically deformed; and wherein the tubular member and an said inner wall of the cylinder are separated from each other by a predetermined distance or more so that the tubular member does not contact the inner wall of the cylinder when said piston member slides inside the cylinder and after the tubular member collides with the stopper member such that the tubular member is plastically deformed.

3. The actuator according to claim 2 wherein a tapered portion is provided inside an opening of the tubular member on a side colliding with the stopper member.

4. The actuator according to claim 2 wherein a sealing member that has a ring shape and abuts on at least a part of the sliding member is provided on a part of an inner wall surface of the bore, and at least a portion of an outer surface of the sliding member that contacts and rubs against the sealing member when the sliding member is assembled has a smooth shape.

5. A safety apparatus comprising:

the actuator according to claim 3;

a push-up member including a bottomed cylindrical portion disposed to cover at least a part of the cylinder, the push-up member including a flange-shaped portion that protrudes outward from an opening or a middle portion of a side surface of the bottomed cylindrical portion, the push-up member being pushed up in one direction by the sliding member; and an ejected object that is pushed up while being supported by the flange-shaped portion of the push-up member.

6. An aerial vehicle comprising the safety apparatus according to claim 5, wherein the ejected object is a parachute or a paraglider.

* * * * *